US010872330B2

(12) United States Patent
Dragushan et al.

(10) Patent No.: US 10,872,330 B2
(45) Date of Patent: Dec. 22, 2020

(54) ENHANCING PROBABILISTIC SIGNALS INDICATIVE OF UNAUTHORIZED ACCESS TO STORED VALUE CARDS BY ROUTING THE CARDS TO GEOGRAPHICALLY DISTINCT USERS

(71) Applicant: RetailMeNot, Inc., Austin, TX (US)

(72) Inventors: Aaron Dragushan, Austin, TX (US); Shaun F. Dubuque, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 712 days.

(21) Appl. No.: 15/208,100

(22) Filed: Jul. 12, 2016

(65) Prior Publication Data

US 2016/0321649 A1 Nov. 3, 2016

Related U.S. Application Data

(63) Continuation-in-part of application No. 15/154,482, filed on May 13, 2016, now Pat. No. 10,078,830.
(Continued)

(51) Int. Cl.
*G06Q 20/34* (2012.01)
*G06Q 20/32* (2012.01)
(Continued)

(52) U.S. Cl.
CPC ......... *G06Q 20/342* (2013.01); *G06Q 20/202* (2013.01); *G06Q 20/3224* (2013.01);
(Continued)

(58) Field of Classification Search
CPC ............... G06Q 20/342; G06Q 20/202; G06Q 20/3224; G06Q 20/3226; G06Q 20/3433;
(Continued)

(56) References Cited

U.S. PATENT DOCUMENTS 5,825,003 A * 10/1998 Jennings ................ G06Q 20/02
235/379
5,878,138 A * 3/1999 Yacobi ................... G06Q 20/02
340/5.41
(Continued)

OTHER PUBLICATIONS

International Search Report and Written Opinion for Related PCT Application PCT/US2017/041316, dated Oct. 20, 2017, pp. 1 to 11.
(Continued)

*Primary Examiner* — Namrata Boveja
*Assistant Examiner* — Slade E Smith
(74) *Attorney, Agent, or Firm* — Pillsbury Winthrop Shaw Pittman, LLP

(57) ABSTRACT

Provided is a process including: receiving a stored value card from a first computing device and a first geolocation of the first computing device, the first computing device having balance access information of the stored value card; receiving a request for a stored value card from a second computing device at a second geolocation; determining to not send the stored value card to the second computing device as a result of the second geolocation being within a threshold geographic distance to the first geolocation; receiving another request for a stored value card from a third computing device at a third geolocation; and determining to send the stored value card to the third computing device as a result of the third geolocation not being within the threshold geographic distance to the first geolocation; and sending balance-access information of the stored value card to the third computing device.

39 Claims, 6 Drawing Sheets

Related U.S. Application Data which is a continuation-in-part of application No. 14/839,058, filed on Aug. 28, 2015, now Pat. No. 9,684,826.

(60) Provisional application No. 62/160,811, filed on May 13, 2015, provisional application No. 62/072,044, filed on Oct. 29, 2014, provisional application No. 62/043,069, filed on Aug. 28, 2014.

(51) Int. Cl.
*G06Q 20/38* (2012.01)
*G06Q 30/02* (2012.01)
*G06Q 20/20* (2012.01)
*G06Q 30/06* (2012.01)

(52) U.S. Cl.
CPC ..... *G06Q 20/3226* (2013.01); *G06Q 20/3433* (2013.01); *G06Q 20/3829* (2013.01); *G06Q 30/0207* (2013.01); *G06Q 30/06* (2013.01); *G06Q 2220/00* (2013.01)

(58) Field of Classification Search
CPC ........... G06Q 20/3829; G06Q 30/0207; G06Q 30/06; G06Q 2220/00; G06Q 20/4016; G06Q 20/322; G06Q 20/20; G06Q 20/32; G06Q 20/4014; G06Q 20/40; G06Q 20/34; G06Q 20/401; G06Q 20/00; G06Q 20/1085; G06Q 20/12; G06Q 20/204; G06Q 20/3278; G06Q 20/35785; G06Q 20/40145; G06Q 20/409; G06Q 20/425; G06Q 30/02; G06Q 30/0261; G06Q 30/0601; G06Q 40/02; H04W 4/02; H04W 24/10; H04W 4/04; H04W 4/80; H04W 64/00; H04W 12/06; H04W 76/14; H04M 15/8033; H04B 17/318; H04B 5/0031; G06F 21/44; G06F 21/73; G06F 2221/2111; G06F 17/30386; G06F 17/3053; G06F 21/31; G06F 21/60; H04L 63/107; H04L 29/06; H04L 29/12009; H04L 29/12047; H04L 43/04; H04L 61/15; H04L 67/18; H04L 67/22; H04L 69/329
USPC .......................................................... 705/44
See application file for complete search history.

(56) References Cited

U.S. PATENT DOCUMENTS

| | | | |
|---|---|---|---|
| 6,859,791 B1 * | 2/2005 | Spagna | G06F 21/10 705/51 |
| 7,857,212 B1 * | 12/2010 | Matthews | G06Q 20/20 235/380 |
| 8,407,142 B1 | 3/2013 | Griggs | |
| 8,662,387 B1 * | 3/2014 | Geller | G06Q 20/342 235/380 |
| 8,775,434 B1 * | 7/2014 | Macgil | G06F 16/9537 707/741 |
| 9,373,112 B1 | 6/2016 | Henderson et al. | |
| 9,652,791 B1 * | 5/2017 | Brock | G06Q 20/20 |
| 9,734,345 B2 | 8/2017 | Spodak et al. | |
| 10,068,287 B2 * | 9/2018 | Nelsen | G06Q 20/351 |
| 2002/0116287 A1 * | 8/2002 | Schubert | G06Q 30/06 705/26.61 |
| 2002/0161711 A1 * | 10/2002 | Sartor | G06Q 20/04 705/51 |
| 2003/0004876 A1 * | 1/2003 | Jacobson | H04M 17/026 705/41 |
| 2003/0182194 A1 * | 9/2003 | Choey | G06Q 20/20 705/16 |
| 2004/0181470 A1 * | 9/2004 | Grounds | G06Q 40/123 705/31 |
| 2005/0071417 A1 * | 3/2005 | Taylor | G06Q 30/0261 709/200 |
| 2005/0080728 A1 * | 4/2005 | Sobek | G06Q 20/28 705/39 |
| 2005/0273342 A1 * | 12/2005 | Levy | G06Q 30/06 705/317 |
| 2005/0278192 A1 * | 12/2005 | Cantini | G06Q 40/025 705/39 |
| 2006/0213979 A1 * | 9/2006 | Geller | G06Q 20/403 235/380 |
| 2007/0150375 A1 * | 6/2007 | Yang | G06Q 30/06 705/339 |
| 2007/0174208 A1 * | 7/2007 | Black | G06Q 20/04 705/75 |
| 2008/0275748 A1 * | 11/2008 | John | G06F 21/6263 705/35 |
| 2008/0296368 A1 * | 12/2008 | Newsom | G06Q 20/354 235/380 |
| 2009/0027191 A1 * | 1/2009 | Farah | H04W 4/029 340/539.13 |
| 2009/0144193 A1 * | 6/2009 | Giordano | G06Q 20/227 705/39 |
| 2009/0171802 A1 * | 7/2009 | Raygoza | G07G 1/0036 705/26.1 |
| 2009/0254480 A1 * | 10/2009 | Esslinger | G06Q 40/00 705/44 |
| 2009/0307028 A1 * | 12/2009 | Eldon | G06Q 30/06 705/37 |
| 2010/0057580 A1 * | 3/2010 | Raghunathan | G06Q 20/0652 705/17 |
| 2011/0238476 A1 * | 9/2011 | Carr | H04W 4/21 705/14.25 |
| 2011/0238514 A1 * | 9/2011 | Ramalingam | G06Q 20/10 705/21 |
| 2011/0238517 A1 * | 9/2011 | Ramalingam | G06Q 20/40 705/26.1 |
| 2011/0276484 A1 * | 11/2011 | Pearson | G06Q 20/40 705/44 |
| 2011/0276495 A1 * | 11/2011 | Varadarajan | G06Q 20/382 705/71 |
| 2012/0066095 A1 * | 3/2012 | Wolter | G06Q 30/06 705/26.63 |
| 2012/0078739 A1 * | 3/2012 | Maraz | G06Q 20/28 705/21 |
| 2012/0143722 A1 * | 6/2012 | John | G06Q 20/4016 705/26.41 |
| 2012/0173402 A1 * | 7/2012 | Nicolaidis | G06Q 30/0207 705/37 |
| 2013/0046697 A1 * | 2/2013 | Schibuk | G06Q 20/32 705/67 |
| 2013/0061290 A1 * | 3/2013 | Mendel | G06Q 20/405 726/4 |
| 2013/0132277 A1 * | 5/2013 | Naqvi | H04W 4/029 705/44 |
| 2013/0297473 A1 * | 11/2013 | Wolfe | G06Q 20/4016 705/35 |
| 2014/0006190 A1 * | 1/2014 | Loomis, III | G06Q 20/20 705/18 |
| 2014/0181908 A1 * | 6/2014 | Doris-Down | H04W 12/00502 726/4 |
| 2014/0249904 A1 * | 9/2014 | Nelsen | G06Q 20/10 705/14.23 |
| 2014/0297527 A1 * | 10/2014 | McLaughlin | G06Q 20/3224 705/44 |
| 2014/0351328 A1 * | 11/2014 | Woods | H04W 4/021 709/204 |
| 2014/0351411 A1 * | 11/2014 | Woods | H04W 4/21 709/224 |
| 2015/0032621 A1 * | 1/2015 | Kar | G06O 20/3224 705/44 |
| 2015/0088607 A1 | 3/2015 | Georgoff et al. | |
| 2015/0120723 A1 * | 4/2015 | Deshmukh | G10L 15/00 707/734 |

(56) References Cited

U.S. PATENT DOCUMENTS

| | | | |
|---|---|---|---|
| 2015/0127536 A1* | 5/2015 | Van Den Broeck | G06Q 20/3224 705/44 |
| 2015/0149357 A1* | 5/2015 | Ioannidis | G06Q 20/3224 705/44 |
| 2015/0186891 A1* | 7/2015 | Wagner | H04W 4/029 705/39 |
| 2015/0193869 A1 | 7/2015 | Del Vecchio et al. | |
| 2015/0199674 A1* | 7/2015 | Kaplinger | G06Q 20/322 705/44 |
| 2015/0213438 A1 | 7/2015 | Kramer et al. | |
| 2015/0219746 A1* | 8/2015 | Wiltzius | G01S 5/0252 455/456.5 |
| 2015/0227934 A1* | 8/2015 | Chauhan | G06Q 20/4016 705/44 |
| 2015/0317663 A1* | 11/2015 | Chinoy | G06Q 20/385 705/14.26 |
| 2015/0334533 A1* | 11/2015 | Luo | H04W 4/029 455/406 |
| 2016/0042228 A1 | 2/2016 | Opalka et al. | |
| 2016/0042342 A1* | 2/2016 | Proctor, Jr. | G06Q 20/3278 705/39 |
| 2016/0042382 A1* | 2/2016 | Isaacson | G06Q 30/0215 705/14.17 |
| 2016/0042434 A1* | 2/2016 | Levitt | G06O 30/0631 705/26.7 |
| 2016/0078484 A1* | 3/2016 | Emigh | G01S 1/72 705/14.58 |
| 2016/0093184 A1 | 3/2016 | Locke et al. | |
| 2016/0132871 A1* | 5/2016 | Bobrovnikoff | G06Q 20/382 705/71 |
| 2016/0328677 A1* | 11/2016 | Ferrer | G06Q 10/0832 |
| 2016/0371676 A1* | 12/2016 | Massiere | G06Q 20/405 |
| 2017/0083930 A1 | 3/2017 | Nagaraj et al. | |
| 2017/0163655 A1* | 6/2017 | Ramalingam | G06Q 20/204 |
| 2018/0300722 A1* | 10/2018 | Matthews | G06Q 20/409 |

OTHER PUBLICATIONS

Giftcard Zen—Buy, Sell, and Trade Gift Cards Online', http://web.archive.org/web/20160422212646/https://giftcardzen.com/, Apr. 22, 2016, pp. 1 to 5.

Giftcard Zen—Buy, Sell, and Trade Gift Cards Online', http://web.archive.org/web/20150525124631/https://giftcardzen.com/, May 25, 2015, pp. 1 to 5.

RetailMeNot: Coupon Codes, Coupons, Promo Codes, Discounts', http://web.archive.org/web/20150512170600/http://www.retailmenot.com/, May 12, 2015, pp. 1 to 10.

RetailMeNot Coupons, Promo Codes and Mobile App', http://web.archive.org/web/20160505044923/http://www.retailmenot.com/, May 5, 2016, pp. 1 to 9.

International Search Report and Written Opinion for related PCT Application PCT/US2016/032434 dated Jul. 27, 2016, pp. 1 to 13.

Related U.S. Appl. No. 15/208,128, filed Jul. 12, 2016, pp. 1 to 66.

Non-Final Office Action for Related U.S. Appl. No. 15/208,128 dated Oct. 17, 2018 pp. 1 to 15.

* cited by examiner

ENHANCING PROBABILISTIC SIGNALS INDICATIVE OF UNAUTHORIZED ACCESS TO STORED VALUE CARDS BY ROUTING THE CARDS TO GEOGRAPHICALLY DISTINCT USERS

CROSS-REFERENCE TO RELATED APPLICATIONS

This patent is a continuation-in-part of U.S. patent application Ser. No. 15/154,482, titled "MODULATING MOBILE-DEVICE DISPLAYS BASED ON AMBIENT SIGNALS TO REDUCE THE LIKELIHOOD OF FRAUD," filed 13 May 2016, which claims the benefit of U.S. Provisional Patent Application 62/160,811, titled "Dynamic Gift Card Allocation," filed 13 May 2015, and which is a continuation-in-part of U.S. patent application Ser. No. 14/839,058, titled "REDUCING THE SEARCH SPACE FOR RECOGNITION OF OBJECTS IN AN IMAGE BASED ON WIRELESS SIGNALS," filed 28 Aug. 2015, which claims the benefit of U.S. Provisional Patent Applications 62/072,044, filed 29 Oct. 2014, and U.S. Provisional Patent Applications 62/043,069, filed 28 Aug. 2014. The entire content of each of these earlier-filed applications is hereby incorporated by reference for all purposes.

BACKGROUND

1. Field

The present disclosure relates generally to probabilistic attribution of fraudulent transactions based on signals emitted by computing devices and, more specifically, to geographically routing stored value cards to enhance such signals.

2. Description of the Related Art

In some cases, people obtain valuable goods and services from others in exchange for drawing upon a balance in a stored value card, which includes the digital equivalent. Examples include open-loop stored value cards and closed-loop stored value cards, each of which may take various forms, such as gift cards, rebate cards, payroll cards, and the like. In many cases, the value stored on the card is spent by presenting to a retailer certain information, such as a card number and a pin number.

Recently, online exchanges have arisen where those in possession of such cards sell the cards, often at a discount relative to the card balance. For example, a user may receive a gift card, as a birthday present, to a store that the user no longer favors, and the user may sell the card, in exchange for cash or another type of card, to the exchange or a different user on such an exchange. In some cases, access to the value of the card is conveyed by sending the card and pin numbers, without transferring possession of any physical token, like the card itself. Thus, a buyer of a card may receive information, for example, an email, text, or in-app data, that they can present on their mobile device to a retailer to buy goods or services with the value remaining on the card. In some cases, the user may then re-sell or leave a remaining balance on the card back to an exchange, or the exchange may authorize the user to only use a portion of the value stored on the card.

This approach, while relatively convenient for users, can give rise to certain types of fraud. One consequence of granting access to cards via networks, e.g., with mobile computing devices, without transferring a physical token, is that each party having access to the card (e.g., the seller, the first buyer who spends part of the balance, the second buyer who spends another part, and so on) could potentially retain the information needed to spend the remaining balance on the card, even after the card has been sold on the exchange or returned to the exchange. For instance, there is a risk the first buyer could use part of the card's balance, return the card to the exchange, and then spend the remaining balance on the card before the card is sold again on the exchange (or after the card is sold but before it is used by the second buyer).

SUMMARY

The following is a non-exhaustive listing of some aspects of the present techniques. These and other aspects are described in the following disclosure.

Some aspects provide a process including: receiving a stored value card from a first computing device and a first geolocation of the first computing device, the first computing device having balance access information of the stored value card; receiving a request for a stored value card from a second computing device at a second geolocation; determining to not send the stored value card to the second computing device as a result of the second geolocation being within a threshold geographic distance to the first geolocation; receiving another request for a stored value card from a third computing device at a third geolocation; and determining to send the stored value card to the third computing device as a result of the third geolocation not being within the threshold geographic distance to the first geolocation; and sending balance-access information of the stored value card to the third computing device.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
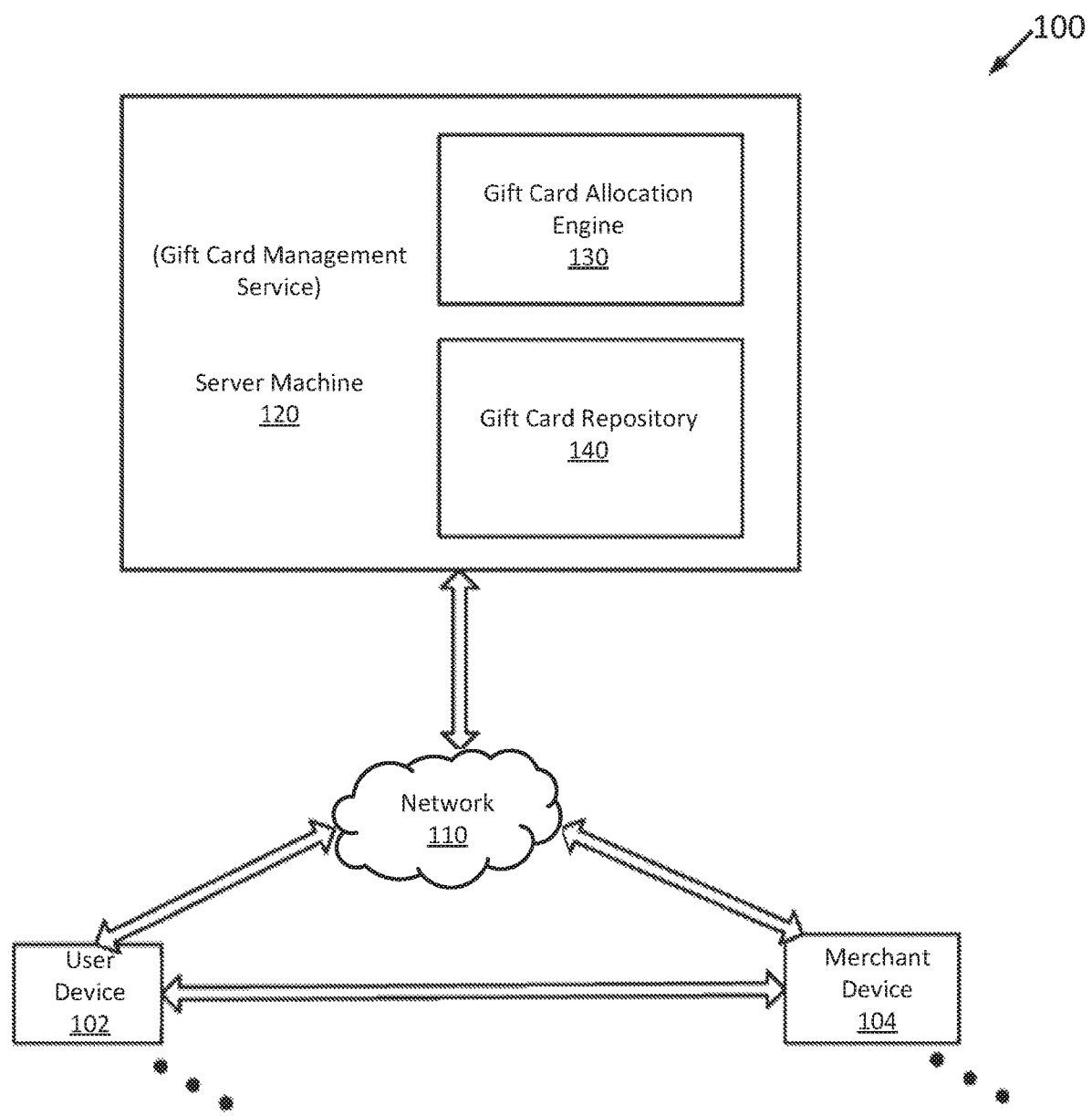
FIG. 1 illustrates the logical architecture of an example of a gift card management system in accordance with some of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer security and payment processing systems. Indeed, the inventors wish to emphasize the difficulty of recognizing those problems that are nascent and will become much more apparent in the future should trends in industry continue as the inventors expect and particularly those problems that cross the boundaries of distinct fields, as is the case here. Further, because multiple problems are addressed, it should be understood that some embodiments are problem-specific, and not all embodiments address every problem with traditional systems described herein or provide every benefit described herein. That said, improvements that solve various permutations of these problems are described below.

It can be appreciated that while many retail establishments use gift cards (e.g., prepaid cards or vouchers that can be used for purchases at the establishment, also referred to as stored value cards), numerous inefficiencies exist. For example, individuals may own gift cards from a retailer from which they are not interested in purchasing anything.

Accordingly, described herein in various implementations are technologies that enable the centralized exchange of such gift cards. Such cards can be bought and sold at a discount, thereby providing liquidity to the original card owner as well as a discounted purchase price (as compared to the original retail price of an item being purchased) to the buyer. Additionally, as described herein, the referenced technologies can provide/maintain a gift card repository and can enable the efficient utilization of such cards in retail settings (both 'brick and mortar' and ecommerce). For example, using a mobile application executing on a mobile device (in conjunction with a central gift card repository/server), a user can utilize gift cards to make retail purchases (thereby benefitting from the discount associated with the utilization of otherwise unused gift cards) in substantially the same amount of time as a conventional retail checkout process would take. In doing so, the user can benefit from the discount associated with gift card utilization while maintaining an efficient/seamless checkout process/experience.

However, as noted, in many Internet-based use cases, everyone who is given access to a gift card (e.g., the information needed to spend, such as previous user possessors who provided this information to, or obtained the information from, a gift card exchange), or some other type of stored-value card, and then returns the card, is in position to double spend the balance. In many cases, to use the gift card, the mobile device displays the information used to authorize a transaction on the gift card. As a result, a nefarious user could write down that information, return the card on an exchange, and then use their own record of the information to draw down the card's balance before another authorized use by another person. Generally, any previous user possessor, e.g., one who has access to the balance access information of a stored value card, is in a position to potentially fraudulently use the card.

This problem is unique to the Internet age because copies of the information are shared, potentially anonymously, over networks, and the ease of transacting results in balances being sliced more finely, putting the card information potentially in the possession of several untrusted parties. Further, users of these systems often expect a seamless experience, and slow, cumbersome authentication schemes are often not commercially feasible. Compounding these challenges, operators of gift card exchanges are often not in a position to dictate technical specifications of the point-of-sale terminals or transaction processing systems by which the cards are spent. As a result, efforts to mitigate fraud often need to accommodate legacy point-of-sale and transaction processing systems.

Some embodiments described below may limit the user's ability to obtain the sensitive card information, e.g., the card number or pin number. Some embodiments may probabilistically classify ambient signals as indicating whether the user is likely at a place where there is a legitimate use of the card, e.g., at a retail store that accepts the card, and in some cases, at certain types of retail stores. The result of the classification may be used to determine whether to display the card information on a display screen of a mobile computing device. For instance, the card information may remain un-displayed and encrypted on the user's mobile computing device until the user 1) requests to use the card; and 2) ambient signals are classified as indicative of legitimate use. In contrast, users who attempt to view the card information when there is no legitimate use likely, like viewing card numbers or pin numbers while at home with a card only usable for in-store transactions, may be prevented from viewing the card's information.

FIG. 1 depicts an illustrative system architecture 100, in accordance with one implementation of the present disclosure. The system architecture 100 includes one or more user devices 102, merchant devices 104, and server machine 120. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface with one another (e.g., user device 102 with merchant device 104). The various illustrated computing devices may be formed with one or more of the types of computer systems described below with reference to FIG. 6.

User device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as mobile applications ('apps'), web browsers, etc. (not shown) may run on the user device (e.g., on the operating system of the user device). It should be understood that, in certain implementations, user device 102 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Merchant device 104 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, a point of sale (POS) system, device, and/or terminal, any combination of the above, or any other such computing device capable of implementing the various features described herein. Various applications, such as mobile applications ('apps'), web browsers, etc. (not shown) may run on the merchant device (e.g., on the operating system of the merchant device). It should be understood that, in certain implementations, merchant device 104 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, barcode scanner, etc. Examples of such communication interfaces include but are not limited to cellular (e.g., 3G, 4G, etc.) interface(s), Bluetooth interface, WiFi interface, USB interface, NFC interface, etc. It should be understood that in certain implementations merchant device 104 may be a dedicated POS terminal (e.g., including an integrated barcode scanner) while in other implementations merchant device 104 may be a handheld or personal computing device (e.g., smartphone, tablet device, personal computer, etc.) configured to provide POS functionality (whether utilizing the functionality provided by the various components/sensors of the device or via one or more connected peripherals). It should also be understood that, in certain implementations, merchant device 104 can be a server, such as a webserver that provides an ecommerce site/service, such as may be accessed by user device 102 via a website and/or dedicated application.

Server machine 120 can be a rackmount server, a router computer, a personal computer, a portable digital assistant, a mobile phone, a laptop computer, a tablet computer, a camera, a video camera, a netbook, a desktop computer, a smartphone, any combination of the above, or any other such computing device capable of implementing the various features described herein. Server machine 120 can include components such as gift card allocation engine 130, and gift card repository 140. The components can be combined together or separated in further components, according to a particular implementation. It should be noted that in some implementations, various components of server machine 120 may run on separate machines (for example, gift card repository 140 can be a separate device). Moreover, some operations of certain of the components are described in more detail below.

Gift card repository 140 can be hosted by one or more storage devices, such as main memory, magnetic or optical storage based disks, tapes or hard drives, NAS, SAN, and so forth. In some implementations, gift card repository 140 can be a network-attached file server, while in other implementations gift card repository 140 can be some other type of persistent storage such as an object-oriented database, a relational database, and so forth, that may be hosted by the server machine 120 or one or more different machines coupled to the server machine 120 via the network 110, while in yet other implementations gift card repository 140 may be a database that is hosted by another entity and made accessible to server machine 120. Gift card repository 140 can store information relating to various gift cards, such as codes, bar codes, and/or any other such identifiers, as well as information relating to such cards (e.g., monetary value, expiration date, usage restrictions, etc.).

It should be understood that though FIG. 1 depicts server machine 120 and devices 102 and 104 as being discrete components, in various implementations any number of such components (and/or elements/functions thereof) can be combined, such as within a single component/system. For example, in certain implementations devices 102 and/or 104 can incorporate features of server machine 120.

As described in detail herein, various technologies are disclosed that enable dynamic gift card allocation. In certain implementations, such technologies can encompass operations performed by and/or in conjunction with gift card allocation engine 130.

Figure 2:
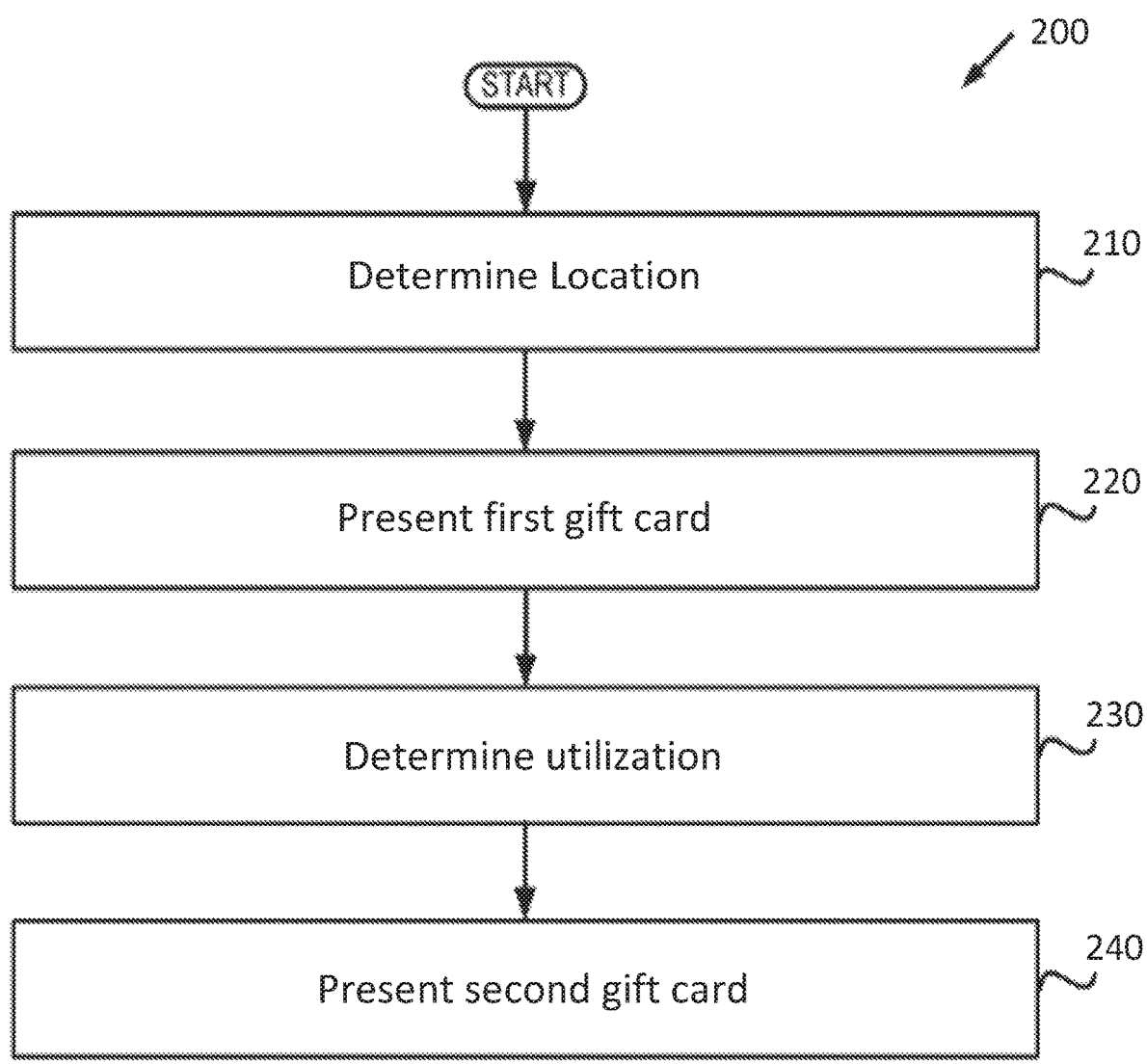
FIG. 2 illustrates an example of a gift card distribution process that may be executed by some embodiments of the system of FIG. 1.

FIG. 2 depicts a flow diagram of aspects of a method 200 for dynamic gift card allocation. The method is performed by processing logic that may comprise hardware (circuitry, dedicated logic, etc.), software (such as is run on a general purpose computer system or a dedicated machine), or a combination of both. In one implementation, the method is performed by one or more elements depicted and/or described in relation to FIG. 1, while in some other implementations, one or more blocks of FIG. 2 may be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a location of a device (e.g., user device 102) can be determined. At block 220, a first gift card can be presented at the device, such as in a manner described herein. In certain implementations, such a gift card can be presented based on the location (e.g., the location of the device determined at block 210). At block 230, it can be determined that the first gift card has been utilized in a transaction. At block 240, a second gift card can be provided at the device. In certain implementations, such a gift card can be provided based on a determination that the first gift card (e.g., the gift card presented at block 220) has been utilized in the transaction. Various aspects of the referenced operations are described and illustrated in greater detail herein.

By way of further illustration, an application (app') executing on user device 102 can request or otherwise determine a current location of the device (e.g., based on GPS coordinates, etc.). Based on the determined location, information regarding one or more retail establishments (e.g., those within a defined proximity to the current location) can be requested/retrieved and presented at the device. In certain implementations, such information can reflect those proximate retail establishments with respect to which gift cards are available (e.g., at gift card repository 140 of server machine 120).

Upon receiving a selection (e.g., by the user) of a particular retail establishment, one or more gift cards (e.g., barcodes, etc., stored in gift card repository 140) can be requested/received by the user device. It should be noted, however, that in certain implementations such gift card information may be requested/received upon determining the location of the device (e.g., by requesting gift cards for those retail establishments that are proximate to the device, maintaining such cards in memory, and presenting them upon receiving a selection by the user of a particular establishment).

In certain implementations, an input can be received (e.g., as provided by the user via the device) that reflects a sale/purchase amount (e.g., the total amount charged by the retailer for a particular purchase, e.g., '$54.63'). Upon receiving such a selection, one or more gift cards can be received, requested, and/or selected (e.g., from those gift cards previously received and stored in the memory of the user device). In certain implementations, such gift cards can be selected/requested (e.g., from gift card repository 140) based on any number of factors, such as the degree to which the credit amount of the gift card approximates/corresponds to the sale/purchase amount. Moreover, in certain implementations the user may be provided with the option to select whether to utilize relatively more gift cards (e.g., of smaller increments, together which add up to the total purchase price, thereby receiving a larger discount), or relatively fewer gift cards (some of which may be of larger increments, thereby necessitating the use of a smaller number of gift cards and providing a more expedient check out process). Additionally, in certain implementations various predictions/projections can be computed with respect to the sale/purchase amount (e.g., based on the retail establishment, the user's purchase history, the amount of time the user has spent in the store, the distance the user has traveled in the store, the areas/departments of the store that the user has visited, etc.), and one or more gift cards can be selected/provided based on such predictions/projections.

Moreover, in certain implementations a gift card having a value that exceeds the total sale/purchase amount may be selected/provided. Upon completion of the transaction, the remaining balance on the gift card can subsequently be provided (e.g., to another user possessor) with respect to another transaction. By way of illustration, a first user may initiate a transaction totaling $60 and a gift card having $100 worth of credit may be selected/provided (e.g., in a manner described herein) in order to complete the transaction (leaving the gift card with $40 worth of credit). Subsequently, a second user may, for example, initiate a transaction totaling $40 and the same gift card (now having $40 worth of credit) may be selected/provided (e.g., in a manner described herein) in order to complete the transaction (thereby utilizing the entire remaining value on the gift card). In doing so, a single gift card can be utilized by different users at different times for different transactions. Moreover, in certain implementations each user will only be required to pay or otherwise account for the portion/increment of the gift card utilized for his/her purchase. Additionally, in certain implementations, once a particular gift card is utilized in a first transaction, such a gift card may be temporarily held (e.g., for a defined period of time and/or until a confirmation of the original transaction and/or the current balance of the card is received/determined) prior to providing the card again for a subsequent transaction. In doing so, the remaining balance on the card can, for example, be confirmed prior to providing it in another transaction.

Additionally, in certain implementations the referenced gift card(s) can be provided to the user device in advance of charging, debiting, etc., the requesting user for the value of the card. That is, as noted above, it can be appreciated that while a gift card of a particular total value (e.g., $100) may be selected/provided in order to complete the transaction, in many scenarios the user may only use a portion of the total value of the card (e.g., $60). As such, in lieu of charging the user the full value of the card (e.g., $100), the gift card can instead be selected/provided (e.g., before the transaction has been completed and without initially charging/debiting the requesting user for the full value of the card), and once the transaction is complete the user can be charged/debited for the increment used during the transaction (e.g., based on the total purchase price as provided by the user, an independent verification of the gift card balance, etc.) while the remaining value on the gift card can be utilized in subsequent transaction(s) (e.g., by other users), such as in a manner described herein.

The various selected/received gift cards can then be sequentially presented/provided, e.g., on the screen of the user device. The user device (e.g., a smartphone) can be placed or otherwise oriented in relation to the merchant device (e.g., in relation to the barcode scanner of a POS terminal) such that the merchant device can scan, read, or otherwise perceive or capture the code/barcode of the gift card being presented. In doing so, the user can complete the retail transaction using gift cards originating at server machine 120. Moreover, in certain implementations a comparable/related technique can be employed with respect to coupons. For example, in certain implementations various coupons can be presented on the screen of the device in a sequence such that they can be received/processed by the merchant device in succession.

It should be understood that in scenarios in which multiple gift cards are to be utilized, such gift cards can be provided sequentially in any number of ways. For example, in certain implementations feedback can be provided/received (e.g., provided by the user to the device, such as by swiping a touch screen or pressing a button) which indicates that another gift card is to be presented. It should also be noted that, in certain implementations, feedback may be provided/received, indicating that a particular gift card did not work (in which case a replacement card can be retrieved/provided).

By way of further example, in certain implementations various sensory inputs can be received and processed by the user device which can be determined to indicate that a presented gift card has been processed and that a subsequent gift card is to be presented (if relevant/necessary). By way of illustration, in certain implementations various audio inputs (e.g., a 'beep' or tone emitted by the merchant device, indicating that a barcode has been scanned) can be received by the user device (e.g., by an integrated or external microphone), and such inputs can be processed to determine that the presented gift card has been processed (and that another gift card, if necessary, is to be presented). By way of further illustration, in certain implementations various visual/optical inputs (e.g., a flash or pulse of the barcode scanner of the merchant device, indicating that a barcode has been scanned) can be received/perceived by the user device (e.g., by an integrated 'front facing' camera), and such inputs can be processed to determine that the presented gift card has been processed (and that another gift card, if necessary, is to be presented). By way of yet further illustration, in certain implementations various motion inputs (e.g., a rotation/orientation of the user device, indicating that a barcode has likely been scanned) can be identified by the user device (e.g., via an integrated accelerometer, gyroscope, etc.), and such inputs can be processed to determine that the presented gift card has likely been processed (and that another gift card, if necessary, is to be presented). It should also be noted that, in certain implementations, various aspects of the timing of the presentation of the referenced gift cards can also be accounted for, such that, for example, upon presenting a particular gift card for a defined time interval (e.g., 10 seconds), another gift card can be selected/requested and displayed.

As noted, certain users may attempt to fraudulently/improperly use the described technologies, such as by capturing/recording gift cards that are presented in order to utilize them at a later time. Accordingly, in order to ensure that presented gift cards are likely to be utilized in legitimate retail scenarios, various determinations can be made, based on which a score can be computed, reflecting the likelihood that the card is (or is not) being used fraudulently. For example, one or more inputs from various motion sensors (e.g., accelerometer, gyroscope, etc.) can be received and processed in order to determine the manner/pattern in which the user device is being maneuvered. A user device that is presenting the gift cards legitimately (e.g., in a retail setting) is likely to exhibit a consecutive series of movements/rotations (e.g., placing the device face down, followed by a rotation of the device such that it is face up, followed by another rotation to face down, etc.), while a device that is being used inappropriately (such that, for example, card numbers/codes are being recorded by the user) is less likely to exhibit such motion (as the user is likely to simply hold the device in place and cycling through multiple cards). Accordingly, in certain implementations the user device and/or the referenced app executing thereon can be configured to present/display the referenced gift cards/barcodes while the device is determined to be positioned in a particular orientation (e.g., face down, as the device is likely to be oriented when the barcode is being scanned), while not presenting (or obscuring) such cards/codes when the device is not so oriented. In doing so, the card/code can be presented when being legitimately used/scanned while not being presented in other orientations which may otherwise enable improper usage. By way of further example, one or more audio inputs can be received (e.g., by an integrated or external microphone) and processed in order to determine an amount/level of sound/noise (e.g., ambient noise) perceptible to the device. In scenarios in which the user device is presenting the gift cards legitimately (e.g., in a retail setting), a certain degree of ambient noise (and/or various sounds, talking, beeps, etc.) is likely to be perceptible, while with respect to a device that is being used inappropriately (such that, for example, card numbers/codes are being recorded by the user), such audio inputs/noise are less likely to be perceived. By way of yet further example, one or more visual inputs can be received (e.g., as captured by one or more integrated cameras) and processed in order to identify/determine various aspects of the surroundings of the device. In scenarios in which the user device is presenting the gift cards legitimately (e.g., in a retail setting), various elements, characteristics, etc. (and changes thereto), are likely to be perceptible, while with respect to a device that is being used inappropriately (such that, for example, card numbers/codes are being recorded by the user), such visual elements, characteristics, etc. are relatively less likely to be perceived/identified. In yet other examples, various aspects of the location of the user device can be accounted for in determining the likelihood that the presented gift cards are (or are not) being used legitimately. For example, utilization of the referenced application in an area that is determined to be residential (and/or is not determined to be a retail location) can indicate that the usage is more likely to be improper.

Some embodiments may automatically check balances for sold and surrendered cards to ascertain whether a card that has been surrendered has had the card balance change, possibly indicating fraud by a user who copied the information on the card. In some cases, the balance checks may be performed through automated interaction with a telephone menu (e.g., by synthesizing appropriate key presses or voice responses and emitting corresponding audio). In some cases, the rate of such checks may be modulated responsive to use of a card, e.g., the rate of checks may be elevated for a threshold amount of time after a card is returned. Some embodiments may perform such checks while a user purports to be in a store, e.g., in response to the user requesting a card or crossing a geofence, to ascertain whether the card was in fact used for a purchase. In some cases, some embodiments may flag a transaction as potentially indicative of fraud in response to a user requesting a card and the balance not changing within a threshold duration of time.

Upon completion of the transaction (e.g., when enough gift cards have been presented by the user device to cover the cost of the purchase), feedback/input can be received by the user device (as provided, for example, by the user) indicating that the transaction is complete (at which point additional gift cards will not be displayed). Moreover, in certain implementations, various aspects of the location of the device can be used in determining that the transaction is complete (and that additional gift cards are not to be displayed). For example, upon determining that the device has traveled beyond a certain distance (e.g., 50 feet) from the area in which the transaction was initiated (and/or from the location of the retail establishment), it can be further determined that the transaction is likely to be complete and additional gift cards will not be presented.

Some embodiments may limit access to a threshold amount of cards, or cards having an aggregate balance, based on statistical distribution of cart values for a particular retail store. For instance, some embodiments may obtain transaction records for each of a set of stores, and for each store, some embodiments may calculate population or sample statistics indicative of a measure of central tendency (e.g., mean, mode, or median) and a measure of variability (e.g., a variance, standard deviation, etc.). Some embodiments may infer a threshold amount above which cart values for a particular store are expected to be very unlikely, e.g., accounting for less than $1/100$, less than $1/1,000$, or less than $1/10,000$ of the transactions at a retail store. Some embodiments may select cards to be sent to a user based on whether those cards, either individually or in the aggregate, contain a balance exceeding this threshold, rejecting cards that would cause the threshold to be exceeded.

As noted above, in order to prevent fraudulent/improper use of the described technologies, various forms of verification/authentication can be incorporated. For example, in certain implementations, in order to utilize the described technologies, the user may be prompted to log in or otherwise associate their gift card usage with a third party login, service, account, etc.

In certain implementations, server machine 120 and/or gift card allocation engine 130 can be configured to select/provide various gift cards based on any number of factors. For example, with respect to gift card sellers that have been determined to be relatively more likely to sell/provide gift cards that may not work, gift cards that are provided by such sellers can be prioritized (e.g., provided to a requesting user as soon as possible), as the more time elapses from the time of sale of the card, the greater the likelihood that the card may not work. By way of further example, with respect to new gift card sellers, gift cards that are provided by such sellers can be prioritized (e.g., provided to a requesting user as soon as possible), in order to provide such sellers with quicker payment for the cards they provide.

It should also be noted that while the much of the foregoing description has illustrated various aspects of the described technologies in relation to utilizing mobile devices in retail transactions (e.g., in conjunction with a POS terminal), in certain implementations the referenced technologies can also be implemented in ecommerce settings (e.g., in conjunction with a web browser). For example, via a browser plugin (and/or any other such application, module, etc.), upon determining that a user is checking out of an ecommerce site (e.g., finalizing/executing an ecommerce transaction), various aspects of the webpage/'shopping cart' can be processed/analyzed. In doing so, the final purchase price can be determined and one or more gift cards can be provided/presented within the checkout interface. In doing so, the user can complete the ecommerce transaction while availing themselves of savings attendant with paying via gift cards.

It should also be noted that while the technologies described herein are illustrated primarily with respect to dynamic gift card allocation, the described technologies can also be implemented in any number of additional or alternative settings or contexts and towards any number of additional objectives.

Figure 3:
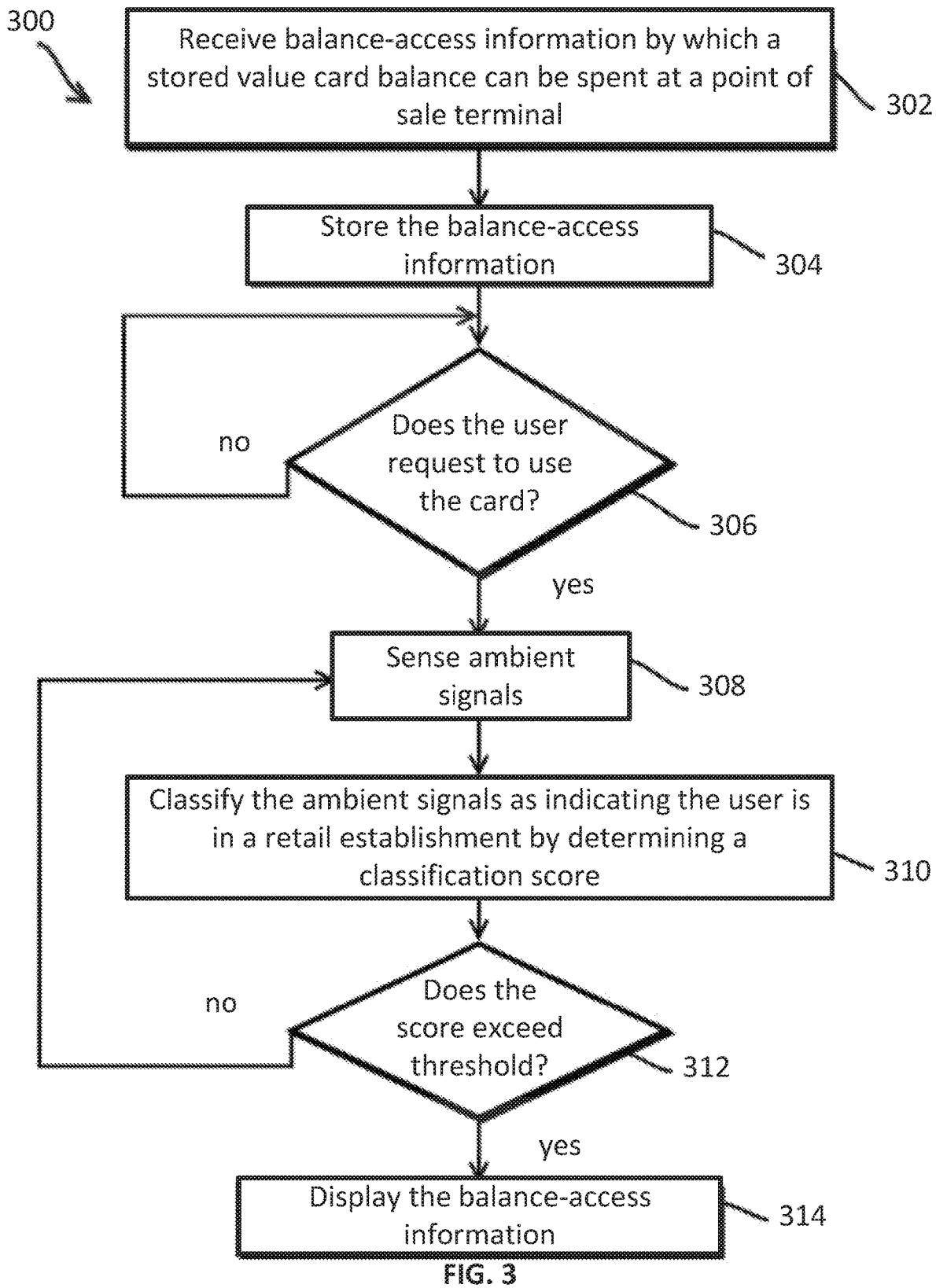
FIG. 3 illustrates an example of a process for reducing fraudulent use of gift cards that may be executed by some embodiments of client devices communicating with the system of FIG. 1.

FIG. 3 illustrates an example of a process 300 to selectively determine whether to display balance-access information for stored value cards based on the output of classifiers that determine whether the mobile computing device executing the process 300 is likely in a retail store. As noted, in some cases, some gift card exchanges may send buyers of gift cards balance-access information for those gift cards (causing those users to be among the possessors of this information), such as a gift card number and a pin number. In some cases, users may attempt to engage in fraudulent transactions by purchasing gift cards, recording in their personal records the balance-access information, and then returning the gift card back to the exchange, for instance, by selling the gift card back to the exchange or by only using a portion of the balance of a gift card that is automatically returned. Such users, wishing to engage in fraud, may then use the balance-access information to engage in a subsequent transaction, before the subsequent legitimate user of the gift card can use the remaining balance. For instance, the user may present online or in person the information in their personal record of the balance-access information to spend gift-card value that they surrendered to the exchange. To make such endeavors less attractive, some embodiments may selectively display the balance-access information in response to determining that the user is likely in a location at which they would have a legitimate reason for accessing such information, for example, at a point-of-sale terminal in a retail store that accepts the card.

In some cases, access may be granted in response to determining that the user has crossed a geo-fence associated with a retail store. However, such techniques, while consistent with some embodiments, may leave open some relatively easy avenues for exploitation, for instance, by accessing the information while in the user's car in the parking lot of the store. In some cases, satellite navigation and geolocation services available on mobile devices are often unreliable and imprecise for indoor positioning, particularly for determining whether the user is within a relatively close distance to point-of-sale terminal, like within 3 to 5 meters, or less. Accordingly, some embodiments may use signals from a variety of sensors to ascertain, based on the mobile computing device's current environment, whether the mobile computing device is likely being used in a legitimate transaction, or whether the mobile computing device is likely being accessed simply to view and record the balance-access information improperly. Some embodiments may engage in this routine in a relatively battery-friendly way, using a combination of ambient signals that collectively yield a relatively low false positive and low false negative rate, thereby providing a relatively seamless experience for the end-user. Further, some embodiments may accommodate a diverse array of types of point-of-sale terminals, including legacy systems that are not specifically configured to address these problems.

In some embodiments, the process 300 may be executed by a mobile computing device, such as a tablet computer, wearable computing device, cell phone, or the like, for instance, a hand-held mobile computing device having a battery. In some embodiments, the mobile computing device may have a suite of sensors, such as a microphone, one or more cameras, a light-intensity sensor, a time-of-flight sensor, an inertial measurement unit, a magnetometer, a satellite navigation signal receiver, and one or more radios, like a Bluetooth radio, a near-field communication radio, a Wi-Fi™ radio, and a cellular radio. Certain combinations of these sensors may produce signals that can be relatively reliably classified as indicating whether a user is in particular a retail store near a point-of-sale terminal. In some embodiments, the mobile computing device may have the features of the computing device described below with reference to FIG. 6, and in some embodiments, the mobile computing device may communicate via the net Internet with the above-described gift card management service, for instance, in the course of performing the process 200 of FIG. 2.

In some embodiments, the process 300 begins with receiving balance-access information by which a stored value card balance (also referred to as a gift card, but not limited to gift cards) can be spent at a point-of-sale terminal, as indicated by block 302. In some cases, this information may be obtained upon (e.g., in response to) a user requesting with a web browser or native mobile application a gift card usable at a particular retailer, for instance, from the above-described gift card management service of FIG. 1.

In some embodiments, this information may be received via email, text, or an API response, like an HTTP request. In some cases, the received balance-access information is received in encrypted form, for instance, as an additional layer of encryption underneath encryption used to convey the information over the Internet, such as a layer under SSL or TLS encryption. For example, the balance-access information may be stored in an AES 256 encrypted blob that is sent over the Internet via a TLS encrypted communication. In some embodiments, the balance-access information may be stored in encrypted form, such that a user interrogating program state or memory of the mobile computing device is unable to view the balance-access information. In some embodiments, the balance-access information is sent as a string, for example, a gift card number and a pin number. In some embodiments, the balance-access information is sent in the form of an image, such as a barcode image or QR code image that, upon being displayed on a display screen of the mobile computing device, can be scanned by a scanner at a point-of-sale terminal to enter the gift card information.

Next, some embodiments may store the received balance-access information, as indicated by block 304. As noted above, in some cases, this information may be stored in encrypted form on the client mobile computing device, for instance, after decrypting a TLS encrypted communication, leaving the encrypted blob in memory, without yet decrypting the AES 256 encryption. In some cases, decryption keys may be stored in obfuscated memory of the mobile computing device, for instance, distributed among several variables of source code by which a native mobile application is written, such that efforts to decompile or otherwise analyze compiled source code are less likely to reveal the decryption keys.

Next, some embodiments may determine whether the user requests to use the card, as indicated by block 306. In some cases, a user may request the card before step 302, and it should be generally noted that the steps described herein are not limited to the order in which the steps are displayed or described. In some embodiments, the user may request to use the gift card through multiple steps, for instance, by requesting gift cards for a particular retailer in a first request, for example, in a request to a native mobile application or webpage that secures responsive balance-access information from the gift card management service, and then later by the user selecting an input in a user interface of the webpage or native mobile application that indicates the user wishes to display the information for entry to a point-of-sale terminal. In some cases, a native mobile application or web page may have an event handler associated with a region of a display screen, and that event handler may detect an on-press event and, in response, advance the routine to additional steps of process 300, for instance, in a press-to-display user interface.

In some cases, a multi-region press may be requested or required, for instance, with two fingers of the user's left hand on one side of the screen and two fingers of the user's right hand on the other side of the screen, such that some inferences about the likely orientation of the screen relative to the user may be drawn by the native mobile application, particularly when combined with readings from an inertial measurement unit, as described below. For example, in some cases, the native mobile application may respond to such a multitouch input upon determining that the orientation of the screen is vertical, as would be the case when a user is holding the screen between their left and right fore fingers and thumbs vertically, with the screen oriented away from the user, toward a retail sales clerk viewing the screen to enter the balance-access information into a point-of-sale terminal. Or, in some cases, a user may merely engage in input indicating the user wishes to use the card, and upon the user releasing a touch, the process may proceed.

Upon determining that the user does not yet request to use the card, some embodiments may continue to wait, or, upon determining that the user does request use the card, embodiments may proceed to the next step.

Next, some embodiments may sense ambient signals, as indicated by block 308. In some cases, waiting to sense ambient signals until the user requests to use the card may reduce battery drain associated with constantly monitoring such signals, for instance, even when the user is nowhere near a retail store or has shown no intent to use a gift card. (Or some embodiments may constantly monitor such signals to provide a more responsive experience at the expense of power consumption.) In some cases, sensing ambient signals may be triggered by one of the two stages of a request to use the card described above, for instance, in response to a user requesting gift cards associated with a given retailer. In some embodiments, sensing of ambient signals may have a timeout threshold at which point sensing may cease to protect the battery of the mobile computing device, and a user may be presented with an input by which the user can indicate an intent to continue attempting to use a gift card.

A variety of different types of signals may be sensed with a variety of different types of sensors on the mobile computing device. In some cases, some of the signals or sensed without regard to whether the user request use the gift card, while other signals, particularly more battery intensive sensors are engaged responsive to a user request. In some embodiments, the sensor is a radio of the mobile computing device, and the signal is a wireless beacon, such as a Wi-Fi beacon or a Bluetooth beacon, or an NFC identifier. In some embodiments, a beacon identifier encoded in the beacon may be compared against a list of identifiers associated with retail stores at which the gift card may be legitimately used, and a wireless environment score may be calculated based on the result of this comparison. For instance, a binary score of one may be output in response to detecting a match, indicating the user is within range of a beacon known to be in a store at which a gift card in memory is usable. In some cases, different scores may be calculated for different gift card stored in memory, as different gift cards may be associated with different types of retail stores and associated ambient environments.

In some cases, users may attempt to spoof such beacons, for instance, by programming the SSID of their home wireless router to match that broadcast at a store to trick systems relying on WiFi™ beacon information, or by configuring Bluetooth™ beacons to broadcast spoofed UUIDs. To frustrate such attacks, some embodiments may sense a rolling encrypted code broadcast in the beacon and determine whether that rolling encrypted code matches an expected current state for a beacon associated with such a retailer. In some cases, wireless beacons may broadcast a rolling encrypted code with a linear shift register algorithm, or with other techniques, like with a KeeLoq™ code. In some embodiments, matching of codes may be determined with one or more remote computing devices, such as via a request to the gift card management service described above, which may compare beacon identifiers to an index of beacon identifiers and respond with a store identifier or binary signal indicating a match. Or in some cases, the gift card management service or the mobile computing device may send a rolling encrypted beacon identifier to a third party server, which may respond with a store identifier.

In some embodiments, wireless radio signals may generally determine the geolocation of the mobile computing device, and classifiers for one or more other types of signals may be obtained in response. For example, classifiers for a set of features known to be associated with a given retail store may be downloaded and stored in cache memory in response to the mobile computing device crossing a geofence associated with that store. In another example, a set of classifiers may be sent to, and stored by, the mobile computing device in response to a particular gift card being sent to the device, for instance, a set of classifiers corresponding to a particular retailer at which the sent gift card is usable. As a result, relatively granular and store specific classifiers may be configured without storing such classifiers for every store to which a user may visit. In some embodiments, the techniques described in U.S. patent application Ser. No. 14/839,058, titled "REDUCING THE SEARCH SPACE FOR RECOGNITION OF OBJECTS IN AN IMAGE BASED ON WIRELESS SIGNALS," filed 28 Aug. 2015 may be used to this effect.

In another example, the sensed ambient signals may be audio signals sensed with a microphone of the mobile computing device. In some cases, the sensed signals may be time-series signals, such as an amplitude of audible signals that varies over time. In some cases, multiple microphones on the mobile computing device may sense multiple audio feeds, and those audio feeds may be used in subsequent steps to determine a directionality of signals.

In another example, a light intensity sensor on the mobile computing device may sense time varying light intensity in the environment of the mobile computing device, for instance, from overhead lighting. In some cases, location signals may be embedded in these fluctuations in the intensity of overhead lighting, or in some cases, different types of lighting may emit useful signals, like 120 Hz oscillations of fluorescent lights, that provide an additional signal by which location may be determined.

In another example, a camera of the mobile computing device may capture an image or sequence of images. In some embodiments, both a front facing and rear facing camera of the mobile computing device may capture images, for instance, to ascertain whether a screen of the mobile computing device is pointed towards a point-of-sale terminal and that a rear facing camera is pointed to a face of the user, thereby demonstrating that the user is less likely to be able to view information on the screen. In some cases, an array of cameras on one face of the mobile computing device may capture images, and computational photography techniques may be used to ascertain spatial information based upon a light field impending upon the mobile computing device. In another example, the mobile computing device may have a time-of-flight sensor by which a scan of 3-D surfaces is obtained, for instance, providing in combination with an image sensor, both a pixel intensity and pixel distance.

In another example, the mobile computing device may have a magnetometer, which may sense a time varying magnetic field and orientation of the magnetic field, such as the user moves through the store, or as may occur due to electromagnetic signals emitted by the operation of circuitry in a point-of-sale scanner. Variations in such signals, either in time or space, may be classified as indicating presence at a point of sale terminal.

In some cases, the mobile computing device may include an inertial measurement unit, such as a six axis accelerometer operative to sense changes in rotational velocity at about three orthogonal axes and the changes in linear translation speed about three orthogonal axes. In some cases, the inertial measurement unit may be operative to sense a downward direction due to acceleration from gravity. In some cases, the inertial measurement unit may output a multidimensional time series, such as a sequence of six dimensional values indicating sensor readings at each of six dimensions at each instance the inertial measurement unit is polled by a native mobile application.

Next, some embodiments may classify the ambient signals as indicating the user is in a retail establishment by determining a classification score, as indicated by block 310. In some cases, the classification score is a weighted combination of a plurality, e.g., two, three, four, five or more, sensor-specific classification scores. In some cases, these weights may be dynamically adjusted over time, for instance, in response to detected miss classifications to reduce a misclassification rate. For example, some embodiments may implement a stochastic gradient descent algorithm to reduce an amount of error on a training set of sensor signals labeled with values indicating whether the collection of signals correspond to a fraudulent use or a legitimate use for instance at a given retail store, such that store-specific sets of parameters may be downloaded upon determining that the user has crossed a geo-fence associated with the store.

In some embodiments, audio signals may be classified by calculating an audio classification score. In some cases, the audio signal may be normalized, for instance, by amplifying or suppressing the signal to reach a target root mean square value or maximum value in amplitude. In some embodiments, features may be extracted from the normalized signal. A variety of different types of features may be extracted. For instance, some embodiments may pass the normalized signal through one or more bandpass filters, and responses exceeding a threshold amplitude output from the bandpass filters may be designated as a feature. In some cases, the features may be two-dimensional features corresponding to both a duration and an indication that an output exceeding the threshold occurred. In some cases, such a feature may correspond to a beep sound emitted by a point-of-sale terminal known to be used by the merchant, for example, as the sales clerk scans items and the system beeps. In some cases, the sound of these beeps may be used as a signal indicative of the presence of a point-of-sale terminal. In another example, some embodiments may extract features by executing a Fourier analysis on the audio signal and extracting features from portions of the output that exceed some threshold duration or amplitude. In another example, some stores may embed location identifiers in in-store audio, and some embodiments may extract those identifier from the audio, for example, by time or frequency demultiplexing the audio signal. In some cases, classification models for the different audio signals may be store specific, and those models may be downloaded based on crossing a geo-fence associated with the store or downloading a card associated with the store. In another example, certain signals of relatively constant duration may be detected with a convolution layer of a neural net that convolve a kernel over time to classify whether a trailing duration of the audio signal includes a beep of a point-of-sale terminal (or other indicative signal). In some cases, such models may be trained by sampling audio and labeling sample audio as indicating a legitimate transaction or a fraudulent transaction, for example, based on logged sensor data and subsequent reported fraudulent uses or legitimate uses. Similar techniques may be used to capture signals from a magnetometer, for instance signals indicating variations in an electromagnetic field arising from operation of a point-of-sale terminal or related equipment, for instance, emitted due to circuitry within an a handheld scanner or theft detection system of the store. Or in some cases, variations in a magnetic field (and IMU) may be integrated to infer a user's geolocation more precisely.

In some embodiments, image signals may be classified, for instance, based on whether the image contains a point-of-sale terminal. In some embodiments, a training set of such images may be captured and manually labeled as including such a point-of-sale terminal. Some embodiments may train a neural network based on the labeled training set, for example, a convolution neural network having a convolution layer corresponding to the portion of the image depicting the point-of-sale terminal. In some cases, a particular part of the point-of-sale terminal may be detected, for instance, a hand-held scanner, which often includes a black screen that is relatively reliably detected in images or a display of a balance that may be relatively reliably detected, both with a relatively bandwidth sensitive classifier model. In some cases, the convolution layer may be applied multiple times across an image at different, overlapping portions of the image to determine whether output neuron of the convolution layer fires, indicating a point-of-sale terminal.

In some embodiments, multiple images may be captured. For example, facial features of the user may be captured in an image taken when setting up an account on a native mobile application, and later, using the techniques discussed above. Some embodiments may determine whether an image taken with a rear facing camera of the mobile computing device includes the user in the frame, while another image taken with another camera facing in the same direction as the screen, includes an image of a point-of-sale terminal. In another example, light signals emitted by a point-of-sale terminal in a scanning process may be detected, either with a light sensor or with a camera. For example, a barcode scanner or QR code scanner may emit a laser of a particular frequency (either or both in electromagnetic frequency and scanning frequency) that may be detected. In some cases, sensed light intensity may be passed through serial bandpass filters, such that light flickering at the scan rate of a barcode scanner, of a color of a scanner laser, is passed through the filters, and a resulting averaged image intensity over a duration of time including multiple scans may be compared to a threshold to classify the image sensor output as indicating the presence of a point-of-sale terminal.

Similar techniques may be used to classify image and time-of-flight sensor outputs. For example, a three-dimensional shape of a portion of a point-of-sale terminal, like a handheld scanner, may be detected in time-of-flight data, for instance, again, using a convolution layer of a trained neural network to account for translation invariant aspects of the signal captured by the mobile computing device.

In some embodiments, a multidimensional time series from the inertial measurement unit may be classified as indicating a particular gesture has occurred or that the mobile computing device is oriented in a particular direction. For instance, to determine whether the mobile computing device is oriented in a particular direction, some embodiments may determine whether the signal corresponding to a particular axis of the inertial measurement unit (e.g., averaged over some trailing duration of time, like one second) exceeds a threshold, indicating the consistent pull of gravity in a particular direction, like when the phone is oriented vertically right side up or upside down or horizontally right side up or upside down.

In some embodiments, a time series of such data may be used to determine whether a particular gesture has occurred, for instance, indicating that the user has rotated and translated the phone through space in a manner consistent with how a user typically presents a display screen to another person entering the information into a point-of-sale terminal, like when a user takes a phone facing towards their face, spins the phone 180° about a vertical axis, translates the phone downward, spins the phone 180° about a horizontal axis, and then tilts the phone away from themselves (spinning about an orthogonal horizontal axis), and holds the phone static. In some cases, users may engage in such motions at different speeds, through different distances and angular changes over time. Accordingly, some embodiments may classify such time series as including a qualifying gesture with a dynamic time warp analysis. For example, a training set of users may be asked to engage in the gesture, and a template for a dynamic time warp algorithm may be trained, for instance with dynamic programming and tuned constraints, based on the sensor data from the training exercise. Later, this template may be compared against sensor data obtained when a user request to use a gift card, and the sensor data may be classified as indicating a gesture associated with legitimate use.

Next, some embodiments may determine whether the classification score exceeds a threshold, as indicated by block 312. In some cases, this threshold may be modulated with the techniques described above by which the weights for combining the various classification scores are combined. Upon determining that the score does not exceed the threshold, some embodiments may continue to sense ambient signals, returning the step 308, in some cases until a timeout determination is made to preserve the battery life of the mobile computing device.

Alternatively, upon determining that the score exceeds a threshold, some embodiments may cause the mobile computing device to display the balance-access information, as indicated by block 314. In some cases, the balance-access information may be decrypted and displayed on a display screen of the mobile computing device. In some embodiments, a barcode may be formed from string balance-access information, such as a linear barcode or a QR code, and a resulting image may be displayed, such that the image may be scanned to enter the information into a point-of-sale terminal. Or in some cases, the information may be displayed in human-readable form, such that a salesclerk can type the information into a point-of-sale terminal. Or, in some cases, the image of the barcode or QR code may be formed on the remote server, and the image may be downloaded, though this use is expected to be higher bandwidth relative to systems that compose such images on the mobile computing device, as the string data encoded therein is often much less data intensive.

A variety of techniques may be executed to impede users from capturing the displayed information. Some embodiments may instruct a mobile computing device to block the mobile computing device from performing a screen capture. Some embodiments may display the balance-access information for a threshold amount of time that is relatively short (e.g., less than five seconds, less than one second, or less than one-half of one second), such that the information may be captured by a machine, but is too quickly removed to be reliably captured by human being. Some embodiments may flash the information on the screen repeated times, such that the scanner has multiple opportunities to capture the information, while a human would find it difficult to record the information. Some embodiments may animate movement of the code on the screen to bring the code in and out of focus of a user camera attempting to capture an image of the code, e.g., exceeding a tracking rate of typical autofocus mechanisms in consumer cameras, while staying within a tracking rate that can be accommodated by point of sale scanners. Some embodiments may compose a plurality of scannable codes, like barcodes, some of which are internally inconsistent and invalid (e.g., dummy codes), and one of which contains the balance-access information in an internally consistent scannable code. In some cases, formats for some scannable codes include redundancy for purposes of error detection and correction, like parity bits. Some embodiments may flash a sequence of scannable codes in which all but one of the scannable codes in the sequence, for example, a randomized one in the sequence, contain invalid codes in which the error detection and correction rules are violated, for instance, with an incorrect parity bit. As a result, it is expected that a point-of-sale terminal scanning the flashing codes will reject all but the legitimate code, while a user attempting to write down the codes will not know which one is legitimate without a much more laborious effort. In some cases, an entire screen may be varied in intensity in synchronicity with a scanning rate of a barcode scanner, such that the lightness or darkness of the screen varies according to what a barcode scanner would sense while transiting across a barcode, thereby conveying a signal to the barcode scanner that matches what would be perceived by a static one or two dimensional barcode without presenting a static image that a user can readily visually parse.

Thus, with various combinations of the above techniques, users may be deterred from engaging in fraud. For instance, some embodiments may determine that transaction is complete in response to determining that the user has moved more than a threshold distance from where a card was requested or displayed. In response, some embodiments may prevent the user from viewing the balance-access information.

In some embodiments, the gift card management system of FIG. 1 may execute various routines to further reduce the likelihood of fraud. For instance, as described below with reference to FIG. 4, some embodiments may infer register balances and select gift cards to match the inferred balance to expedite gift card exhaustion. For instance, some embodiments may estimate a register balance based on a distribution of previously known balances for a given retailer and for users deemed to have a profile similar to that of the user requesting cards. Some embodiments may then obtain a set of candidate cards and select among the candidate cards based on 1) a current balance of the candidate card; 2) a risk score determined for each candidate card (e.g., based on an amount of users who have had access to the card and whether those users have a relatively long history of non-fraudulent card use recorded in the system). Some embodiments may select the card closest to the inferred register balance having a risk score above a threshold. Some embodiments may calculate a weighted combination of the risk score and an inverse of the difference between the inferred register balance (or an actual balance) and the card balance. Some embodiments may rank the cards based on this weighted combined score and select a highest scoring card. Some embodiments may select a riskiest card having a balance expected to be exhausted by the inferred register balance.

Figure 4:
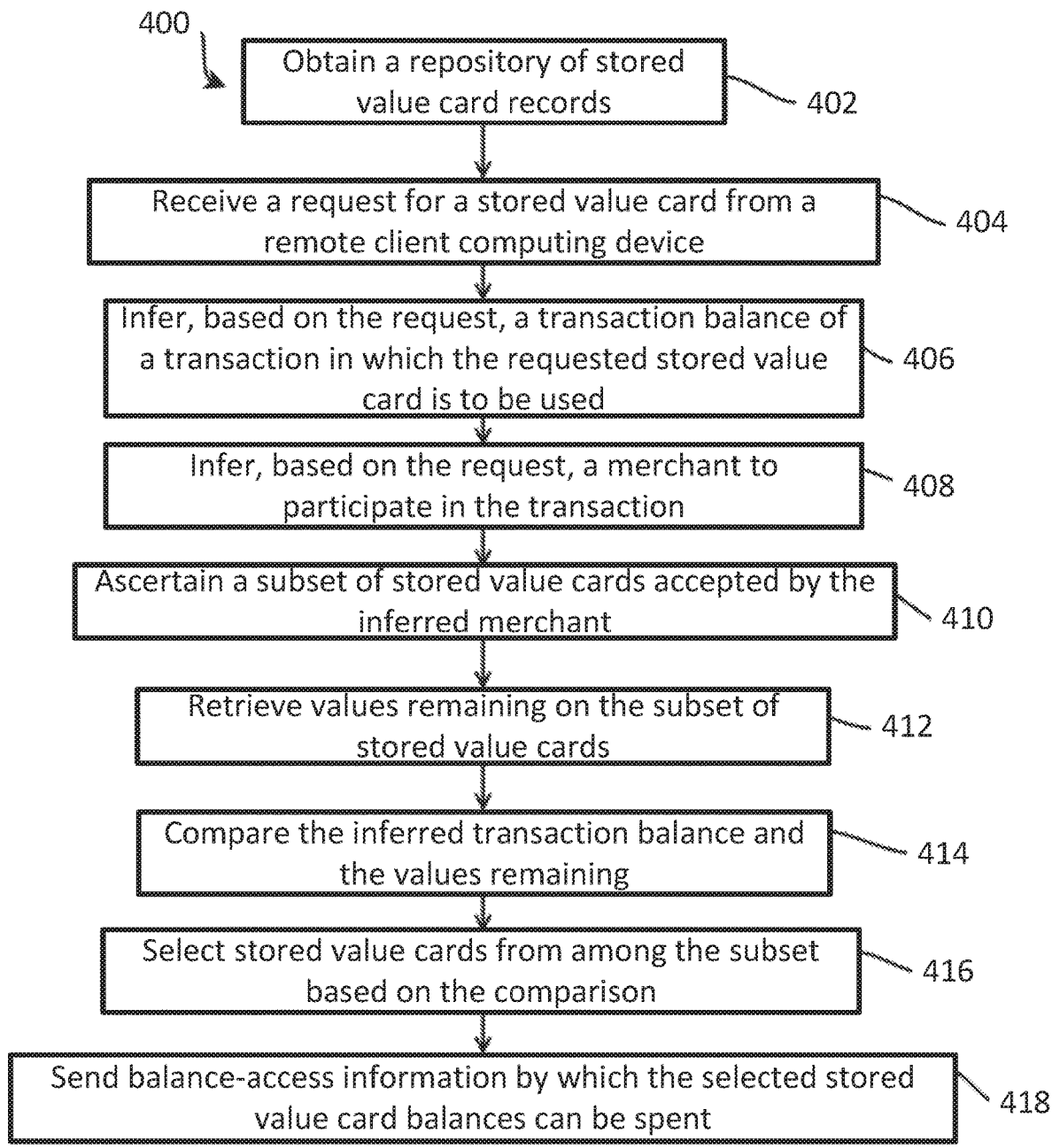
FIG. 4 illustrates an example of a process to allocate stored value cards with relatively low latency while approximating a combinatorial optimal allocation.

FIG. 4 shows an example process 400 that may be performed independently or by some of the above-described embodiments of a gift card management system in order to select among an inventory of stored value cards pursuant to various objectives. For example, some embodiments may select stored value cards based on an inferred register balance of a transaction and the amount of value remaining on the cards, such that some (e.g., a higher risk subset) or all of the inventory can be exhausted relatively quickly. As noted above, the more parties that possess the balance-access information of stored value cards, the greater the risk of fraud, as each previous holder of this information is potentially in a position to spend the balance even after the card has been returned, for example, to a gift card exchange. To mitigate this risk or address other issues, some embodiments may select among the inventory of stored value cards to exhaust the value of the cards relatively quickly, for example, particularly high risk cards, such as those received from users having relatively short histories of use with the system described or users whose profile correlates with indicia of fraud.

In many cases, choosing the appropriate stored value card (or combination of cards) is a relatively computationally challenging task. Often the number of stored value cards is relatively large, for instance, exceeding 1000 cards, 10,000 cards, and in some cases 100,000 cards, with the various cards have varying remaining balances falling within a range of values that can also be relatively large, such as spending between $0.10 and $5000.

Further, in some cases, each of these cards may have a different risk score based on the history of the card, for instance, based on a number of previous possessors of balance-access information of the card, an amount of value remaining on the card, an amount of time since a previous user returned or provided the card, and attributes of user profiles of previous possessors of the card, along with a risk score associated with the merchant or merchants at which the card is redeemable. In some cases, such risk scores may be based on a weighted combination of each of these parameters, with the merchant risk score being a percentage of transactions at the merchant using provided cards that are deemed fraudulent, for instance, based on a previous pattern, like over a trailing duration of one year. In some cases, the weights of the weighted combination, such as a weighted sum, may be adjusted based on historical data. For instance, some embodiments may arbitrarily select weights, and then iteratively adjust the weights based on the historical data to reduce or minimize an amount of cumulative error between predictions by the weighted sum of previous transactions being fraudulent and observed results of those historical transactions either being fraudulent or non-fraudulent. In some cases, this historical data may be a training set that is relatively large, for instance, having more than 10,000 previous transactions, more than 100,000 previous transactions, or more than 1 million previous transactions, with transactions labeled as either fraudulent or non-fraudulent. Weights may be re-calculated periodically as a batch process, e.g., weekly.

In some cases, stored value cards may be associated with a demand score, such as an estimated time to exhaustion for each respective stored value card. In some embodiments, the demand score may be based on an amount of merchants that accept the stored value card, as some stored value cards are accepted by many merchants, while others are merchant specific, and the latter often tend to have lower demand. In some cases, the estimated time to exhaustion may be a weighted combination of an amount of cards within a threshold of the same balance in the inventory, an amount of merchants that accept the stored value card, and an amount of requests (like a frequency) for which the stored value card is suitable. In some cases, stored value cards with lower demand scores may be favored when selecting a stored value card to be provided over stored value cards with higher demand scores likely to qualify to respond to other requests. In other cases, a demand score may correspond to a spread between a market-clearing discount to obtain cards and a card balance or a market-clearing discount to provide cards and a card balance, or a combination thereof.

In some cases, choosing the appropriate stored value card includes determining whether to deploy a relatively low or relatively high risk stored value card or collection of cards in response to a given request, where that request is one of a relatively large number of requests received over a relatively short duration of time, like at a rate exceeding 10 per minute, 100 per minute, or during holidays, 1000 per minute. Matching stored value cards or combinations (e.g., 2, 3, 4 or more cards with balances that sum to a desired amount) of such cards to these requests in a way that exhausts balances relatively quickly, accounting for the risk scores and demand scores associated with the cards, is a relatively challenging computational task as the number of cards scales. In some cases, this problem may constitute a form of the bin packing problem in computer science, a problem known to scale very poorly and labeled in the field of computer science as a combinatorial NP-hard problem.

Compounding this challenge, users often expect relatively prompt responses to requests for stored value cards, for instance, within less than 10 seconds of sending a request, and in many cases, user engagement is expected to be severely diminished when responses take less than 500 ms. Thus, in some use cases, the selection of stored value cards to respond to requests combines a relatively challenging computational problem with a relatively severe latency objective, though not all embodiments address both of these issues, particularly simultaneously, as several independently useful inventions are described herein and some embodiments relate to those other embodiments other inventions. For instance, some embodiments may assign stored value cards periodically, in response to a group of requests accumulated over a trailing duration, like over a day, and optimize (or approximate an optimum) for the group.

The challenge of disposing of stored value card inventory relatively quickly among relatively large scale collections is further aggravated by a frequent lack of certain relevant information in many traditional systems. Often, when a user requests a stored value card on a card management system, the user does not indicate a balance of a transaction in which the user intends to use the stored value card. For instance, a user may simply request stored value cards in the range of $50-100, without indicating that they are about to engage in a particular transaction with a register balance of $87, such as in person at a point-of-sale terminal or online in a checkout page of a merchant website. Further, users are often disinclined to enter this information, as the extra keystrokes or user input actions tend to deter use of stored value card management systems.

To mitigate some, in some cases all, and in some cases other, of the problems described above, some embodiments may infer a register balance and select a stored value card or set of stored value cards relatively quickly in a way that exhausts balances while accounting for risk and demand associated with the respective cards. Or some embodiments may provide a subset of these benefits or other benefits. These techniques are exemplified by the process 400 of FIG. 4.

In some embodiments, the process 400 begins with obtaining a repository of stored value card records, as indicated by block 402. In some cases, this repository may be an inventory of stored value cards like those described above. In some cases, the records may indicate a list of user identifiers of users who previously possessed balance-access information of the stored value card, and those user identifiers may serve as index key values by which user profiles may be accessed, the user profiles having logs of previous transactions of the user, demographic attributes, and other attributes of users. In some cases, each record may include dates and users who provided or returned the stored value card, dates and users who consumed the stored value card, and indications of changes in balance of the stored value card caused by the respective users. In some embodiments, instances in which stored value cards were sent or received may each be associated with the respective geolocation, network address, and device identifier of the computing device of the user with which the stored value card was exchanged.

In some embodiments, the process 400 may include receiving a request for a stored value card from the remote client computing device, as indicated by block 404. In some embodiments, this step may be performed by one of the server-side systems described above, upon a client device, such as a client device executing a native application for accessing stored value cards and offers, or a web application, such as a web application for accessing stored value cards and offers. In some cases, the received request may be associated with a geolocation. For instance, a geolocation may be obtained based on a network address of a packet conveying the request, such as an Internet Protocol address known to be associated with a geographic area. In another example, the geolocation may be obtained by a native mobile application of the client device, for instance, by querying a geolocation framework of an operating system of a mobile computing device and receiving a geolocation, like a geolocation determined based on a current wireless environment, for instance, based on Global Positioning System sensors, cell tower triangulation, Wi-Fi beacons, Bluetooth beacons, or the like. In some cases, the reported geolocation may be associated with an uncertainty, such as a confidence radius.

In some embodiments, the request may specify a merchant, such as a merchant with which the user intends to engage in a transaction, and a merchant that accepts stored value cards of the type requested. In other embodiments, the merchant may be inferred, as described below.

Next, some embodiments may infer, based on the request, a transaction balance of a transaction in which the requested stored value card is to be used, as indicated by block 406, and infer, based on the request, a merchant to participate in the transaction, as indicated by block 408. In some cases, these steps may be performed concurrently or in the different order from that described, which is not to suggest that other steps must be performed in the order presented.

In some embodiments, transaction amounts may be inferred based on the merchant. For instance, some embodiments may periodically interrogate historical transaction records by grouping the records by merchant, such as records extending into a previous year, and calculating a measure of central tendency of transaction amounts for each merchant, like a mean, mode, or median. In some cases, other distributional statistics may be calculated, like a variance, standard deviation, or other parameters of other distributions, like lambda of a Poisson distribution. In some embodiments, the inferred transaction amount may be based on these values, which may be calculated in advance of receiving the request, for instance, as a batch process nightly or weekly to expedite responses. In some cases, the inferred amount may be the measure of central tendency value for the respective merchant. In some embodiments, the inferred amount may be the measure of central tendency plus or minus some coefficient times the value of distributional statistics, like the measure of central tendency plus or minus one standard deviation or two standard deviations. In some cases, the coefficient may be adjusted dynamically by some embodiments based on an amount of cards in inventory to make the exhaustion of gift cards more likely or make the likelihood of the user needing multiple stored value cards for a given transaction less likely.

In some embodiments, the inferred transaction balance may be inferred based on other information provided to the user. For instance, some embodiments may send the user offers, like coupons, discounts, rebates, and the like, prior to sending gift cards, and the inferred amount may be based on this information. For instance, in response to sending the user a 25% discount coupon, and in some cases, in response to receiving an indication that the user redeem the coupon, some embodiments may lower the inferred amount by the corresponding 25%.

In another example, some embodiments of a native mobile application executed by client devices may be configured to automatically or in response to user input apply offers, then stored value cards from an exchange (like from the gift card management system herein), and then transfer value to the merchant via an electronic wallet to satisfy the balance with the aggregate of these three measures, e.g., in that order, such that coupons are applied, first, then stored value cards, then an electronic wallet. In some cases, the native mobile application may be provided the transaction balance in the course of this sequence, such as via a near field communication exchange with a point-of-sale terminal, or via other wireless exchanges or based on information being entered by a user, e.g., spoken and processed by a speech-to-text algorithm or entered on a touchscreen. Thus, in some cases, inferring the transaction balance may include calculating the transaction balance, for instance, after one or more offers are applied, but before an electronic wallet is accessed to satisfy the remaining balance. In some cases, this inference may be performed client-side, with the client reporting the inferred amount to the server, or server-side (e.g., at the gift card management system).

In some embodiments, the above-described coefficient may be adjusted in response to a user engaging in this type of use case, as users are expected to be less put off by a transaction balance remaining after the gift card is applied when an electronic wallet is integrated into the user experience. For instance, in some cases, the coefficient may be a negative value in response to the user engaging in this workflow, and a positive value in response the user not requesting the use of an integrated electronic wallet following the presentation of stored value cards.

As noted, in some cases, the merchant may be inferred. In some embodiments, the merchant may be inferred based on a geolocation associated with the request. For instance, some embodiments may maintain a geographic information system having polygons corresponding to boundaries of merchant retail establishments, and some embodiments may determine whether the geolocation associated with the request falls within one of those polygons or identify a closest polygon to identify the merchant. In other cases, the merchant may be identified by other attributes of the current wireless environment, such as based on an identifier in a Bluetooth beacon or in a wireless local area network beacon emitted within the merchant's facility and sensed by a native application executing on the client device. Other examples include beacons encoded in overhead lighting fluctuations and beacons encoded in in-store audio, each of which may also be sensed by the native application. In some cases, these identifiers may be reported to the gift card management system to facilitate identification of the merchant. In some embodiments, the gift card management system may maintain a mapping of these identifiers to the corresponding merchants, and in some cases, information like signal strength associated with the identifiers, such that users may be triangulated to be within a merchant's facility based on both signal strength and identifier values.

In some embodiments, the transaction balance or merchant may be inferred based on a profile of the user associated with the client computing device issuing the received request. For instance, some embodiments may maintain in such user profiles a list of historical transactions by the user, each transaction identifying a merchant facility or merchant, and in some cases a category in a taxonomy of merchants, such as a hierarchical taxonomy. Some embodiments may rank for each user the set of merchants (or facilities, or categories) according to a transaction frequency and infer a highest ranking merchant (or facilities, or categories). Or some embodiments may determine that two merchants are within a threshold distance of a geolocation of the request and select among the two candidate merchants based on which of the two candidate merchants appears higher in the ranking. Or some embodiments may construct a ranking of categories in the taxonomy according to transaction frequency and select between the candidate merchants based on which falls within a higher ranking category for the respective user. To expedite responses, some embodiments may pre-calculate these rankings, for instance periodically, like in a weekly batch process. In some cases, the rankings may be adjusted based on freshness of the transactions, for instance up weighting more recent transactions, like according to a half-life score, where the weight afforded a transaction decreases by half according to some half-life duration of time.

Some embodiments may ascertain a subset of stored value cards that are accepted by the inferred merchant, as indicated by block 410. In some cases, this step may be performed by querying the repository of stored value card records for records that indicate the respective stored value card is accepted by the inferred merchant. In some embodiments, the query may specify that stored value cards less than or equal to the inferred balance are requested to reduce the amount of responsive records and render subsequent computations more tractable, though embodiments are consistent with other implementations.

Next, some embodiments may retrieve values remaining on the subset of stored value cards, as indicated by block 412. In many cases, the subset of stored value cards may be relatively large, for example, more than 50, and in many cases more than 500 or more than 5000 stored value cards in inventory may be accepted by the inferred merchant. In some cases, other values may be retrieved as well, like the other values described above as being in the stored value card records. In some embodiments, the subset may be too large to be computationally feasible for subsequent steps, and some embodiments may determine whether the subset exceeds a threshold count and sample the subset, for instance randomly, up to the threshold. Or some embodiments may select among the subset according to various other criteria, for instance, ranking the subset according to the demand score or the risk score or a weighted combination thereof and selecting those with a rank that satisfies a threshold ranking.

Next, some embodiments may compare the inferred transaction balance and the values remaining, as indicated by block 414, and select stored value cards from among the subset based on the comparison, as indicated by block 416. In some cases, the comparison may include calculating a difference between each of the values remaining in the subset and the inferred transaction balance and ranking the stored value cards according to the difference. Some embodiments may select a stored value card having a smallest difference, such as a smallest difference less than the inferred transaction amount, a smallest difference greater than the inferred transaction amount, or a smallest difference in absolute value relative to the inferred transaction amount. In some cases, the differences may be weighted according to the risk scores and demand scores of the respective cards, e.g., making riskier cards register as better matches than would otherwise be the case, or lower demand cards register as better matches than would otherwise be the case.

In some embodiments, the selection may account for combinations of the stored value cards, such as up to some threshold amount of cards in combination, like 2, 3, 4, 5, or more stored value cards in combination. In some cases, some stored value cards may include relatively small balances that may be requested relatively rarely, and combining cards is expected to be an effective way to dispose of that inventory (though not all embodiments afford this benefit). Some embodiments may calculate the above-described differences for each combination of stored value cards up to some threshold and select a response of combination according to the aggregate balance of the combination, as described above.

However, selecting among the possible combinations is often a relatively computationally taxing task, as the amount of combination scales relatively poorly with the number of cards to be combined and the number of cards in the subset. In some cases, the value scales according to a binomial coefficient function, e.g., choosing combinations of 4 from 1000 cards yields 41,417,124,750 possible candidates. Processing one candidate per cycle of a modern CPU, which significantly understates the challenge as analysis takes substantially more cycles, would take over ten seconds for a 3 GHz clocked CPU.

A number of techniques may be implemented to expedite this operation. In some embodiments, combinations or subsets of possible combinations may be precalculated. For instance, some embodiments may precalculate an inventory of representative combinations, with each item in the inventory corresponding to some range of values of relatively fine granularity, such as by a one cent or ten cents. In some embodiments, within each bin, some embodiments, may identify combinations that fall within the bin and otherwise score relatively favorably according to demand and risk, for instance, populating each bin with a threshold number of combinations, like 10 or more. Some embodiments may then deplete the inventory of candidate combinations by accessing these precalculated combinations, selecting from a bin that matches an inferred transaction balance. In some embodiments, the pre-calculated combinations are selected such that cards in one precalculated combination are not shared with another precalculated combination, to avoid interactions that might otherwise arise when one combination is deployed.

In other embodiments, the aggregate amounts may be precalculated and associated with identifiers of the cards constituting the combinations, for instance, in a sorted list by aggregate amount to expedite search. Some embodiments may then query the sorted list to identify a precalculated combination that matches (e.g., either exactly or according to the above-described difference calculations) the inferred transaction balance. Or some embodiments may perform the calculations at the time of the request, e.g., on a subset of the candidate combinations.

In some embodiments, the selection may favor speed or risk, depending upon how the selection is constructed. For example, some embodiments may execute a greedy selection algorithm, for instance, selecting a best match (e.g., as indicated by the above-described examples of difference calculations) for a given request. Or some embodiments may partially or fully optimize the selection over a collection of requests, for instance, by declining to select a more optimal candidate for a given request and sending a less optimal candidate in response to the given request, so that the more optimal candidate is reserved for a pending or expected subsequent request for which the more optimal candidate is an even better fit. In some cases, batches may be optimized according to a simulated annealing algorithm where the cost function is a weighted combination of the risk score, the demand score, and the balance amount. Some embodiments may optimize according to a subset of the candidate responses, such as grouping candidates into groups of 1000 and optimizing among a group of pending requests, such as requests received within some trailing duration, like a preceding one second, minute, hour, or day.

Next, some embodiments may send balance-access information by which the selected stored value card balances can be spent, as indicated by block 418. As noted, this may entail sending balance-access information for only one stored value card or may include sending balance-access information for a plurality of cards. In some cases, the cards may be sent in ranked order according to the balance, with higher balance cards being sent first. In some embodiments, the cards may be sent in ranked order according to risk, with higher risk cards being sent first. In some embodiments, the cards may be sent in ranked order according to demand, with lower demand cards being sent first. In some embodiments, the cards may be sent in ranked order according to a weighted combination (such as a weighted sum) of these parameters.

Similarly, some embodiments may suppress the number of cards a user accesses in a transaction. For instance, a user may combine two or three or more gift card balances to pay a register balance. The more cards consumed and not exhausted, the greater the risk of fraud. Accordingly, some embodiments may rate limit a number of cards a user is allowed to access or rate limit an aggregate balance of cards a user can access. Similarly, some embodiments may select among candidate cards to reduce the number provided to a given users, e.g., by favoring cards close to the inferred (or actual) register balance.

Even with the above techniques in use, some fraud may still occur. Some embodiments may execute routines that render such fraud easier to detect. For instance, some embodiments may distribute cards geographically to enhance the power of the purchase location to signal fraud. In some cases, a card may be sent to a first geographic area and returned with a balance. Later, a user in a different geographic area (e.g., more than a threshold distance, or having less than a threshold co-occurrence rate among users between the two locations) may request a card for the same retailer. The card for the later user may be selected in response to determining that this geographic threshold is satisfied. A different later user in the first geographic location may not be provided the card upon determining that the geographic locations are the same. Later, if fraud occurs, the location of the fraud is expected to be indicative of which user holding a given card engaged in fraud, as it is expected to be less likely that a user will travel to a relatively distant geographic location to spend a card they previously surrendered, rather than attempt to use the same card in their same area.

Figure 5:
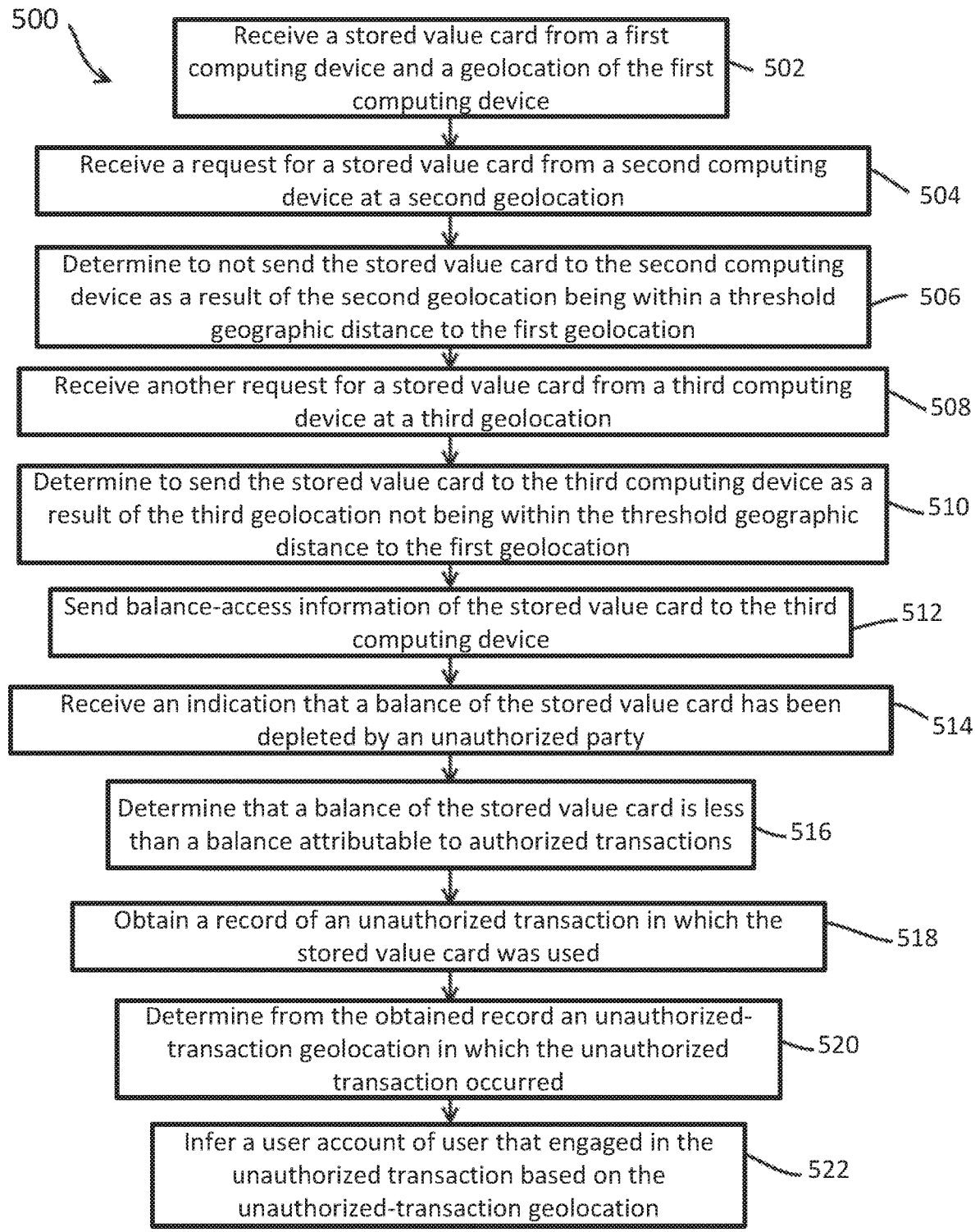
FIG. 5 illustrates an example of a process to allocate stored value cards to enhance probabilistic signals by which unauthorized card use is attributed to a party.

FIG. 5 shows an example of a process 500 configured to allocate an inventory of stored value cards in a fashion that is expected to make fraud relatively detectable (e.g., attributable to an individual) compared to conventional techniques. In some cases, the process 500 may be executed by the above-described gift card management systems, for instance, when interfacing with various instances of the client-side devices described above, though it should be emphasized that the process 500 is not limited to that implementation and may be used in other contexts.

In some cases, steps for performing the process 500 may be stored on a tangible, non-transitory, machine-readable medium, such that when the instructions for the steps are executed, the operations described with reference to the process 500 may be executed, as is the case with the other processes described herein. Similarly, the process 500 is not limited to the sequence shown, as some steps may be performed in a different order, some steps may be performed concurrently in multiple instances, and some steps may be omitted, as is the case with the other processes described herein, and which is not to suggest that other features are limited to the embodiments described.

In some cases, the process 500 begins with receiving a stored value card from a first computing device and a first geolocation of the first computing device, as indicated by block 502. In some cases, the step may include receiving and updating the information in the above-described stored value card records created when a stored value card is received from a user. In some cases, the stored value card may be received from an initial owner of the stored value card, such as a person who received the card as a birthday gift or bought the card in a store, or in some cases, the stored value card may be received from a subsequent possessor of the stored value card information, such as someone who received the balance-access information according to the above-describe techniques. In some cases, receiving the stored value card includes receiving the balance-access information or receiving an indication that the user is representing they will no longer use the balance-access information (already possessed by the gift card management system) and are returning the card after partial use. In some cases, the geolocation may be obtained with the techniques described above and may indicate a current geolocation of the first computing device. Geolocations may be expressed in a variety of formats, including latitude and longitude coordinates, identifiers of places of interest (like polygons bounding merchant facilities), or identifiers of geographic regions, like ZIP Codes, cities, states, military grid reference system identifiers, and the like.

Next, some embodiments may receive a request for a stored value card from a second computing device at a second geolocation, as indicated by block 504. In some embodiments, the request may include an identifier of the second geolocation, which may be obtained with the techniques described above. In some cases, the second computing device is a computing device associated with a different user than the first computing device, for instance, various user accounts may include credentials in user profiles with which users sign into the above-describe systems or device identifiers, such as MAC addresses, UDIDs, ADIDs or the like.

Next, some embodiments may determine to not send the stored value card to the second computing device as a result of the second geolocation being within a threshold geographic distance to the first geolocation, as indicated by block 506. This determination may be made with a variety of techniques and does not necessarily require comparing the threshold geographic distance to a distance between the first and second geolocations.

For instance, as a consequence of such a distance, the first geolocation may be with within one region of the country and the second geolocation may be within the same region, like within the same state or within the same city or ZIP Code. Thus, some embodiments may make the determination by determining that the first geolocation and the second geolocation are within the same geographic region, such as a geographic area larger than 1 $km^2$ and smaller than 100,000 $km^2$ or the continental United States.

In another example, the determination may be that the second geolocation is within the threshold geographic distance of the first geolocation, such as within less than 10 km, less than 100 km, or less than 1000 km.

In another example, the determination may be that the second geolocation is within some threshold travel time of the first geolocation, such as within less than 10-minutes travel, 1-hour travel, 10-hours travel, or two-days travel, by various modes of travel, such as by automobile, by airplane, by walking, or the like.

In another example, the determination may be less directly a consequence of the distance between the first and second geographic locations, while still being a result of such a distance. Some embodiments may maintain in memory a history of previous geolocations visited by users, and some embodiments may determine which geolocations tend to co-occur for the same users, for instance, within a city, a soccer field and a children's school may tend to co-occur relatively frequently for a subset of the population, while a bar and a golf course may tend to co-occur for a different subset of the population. And a bar or soccer field in another city may tend to not co-occur relatively frequently with either subsets of the population. Some embodiments may determine that a co-occurrence amount (e.g., count or rate) between the first geolocation and the second geolocation exceeds a co-occurrence threshold and determined not to send the stored value card to the second computing device as a result.

Alternatively or additionally, the determination may be based on other factors beyond geolocation. For example, some embodiments may adjust the size of the threshold based on other similarities in user profiles associated with the first computing device and the second computing device. Some embodiments may determine that the user profile associate with the first computing device has more than a threshold number of transaction co-occurrences historically with the second computing device and, as a result, determine not to send the stored value card to the second computing device or determine to adjust the threshold with respect to distance to be smaller. The transaction co-occurrences may take a variety of different forms, including the respective users engaging in historical transactions with the same merchants, the same merchant locations, the same categories a merchants, or combinations thereof.

In some embodiments, the determination may be adjusted based on attributes of the stored value card. For example, stored value cards having a particularly low demand score less than a threshold or a risk or higher than a threshold may cause the system to adjust geographic distance thresholds or user profile similarity thresholds, for instance, decreasing the distance threshold in response to the demand score being less than a threshold to move cards in low demand even at the expense of higher risk of fraud for which blame is difficult to attribute.

Thus, some embodiments may determine not to send the stored value card to the second computing device because the second computing device's user is likely to use the stored value card in a way that is difficult to distinguish from uses by the first computing device user, thereby making it difficult to identify whether the first user or the second user engaged in a subsequent fraudulent transaction, for instance, by exploiting balance-access information of a stored value card that they already indicated have been surrendered to the gift card management system.

Some embodiments may then receive another request for a stored value card from a third computing device at a third geolocation, as indicated by block 508. In some cases, each of these receive requests may be similar in format. In some embodiments, the third computing device is associated with a different user account in different user profile from that of the first computing device and the second computing device.

Next, some embodiments may determine to send the stored value card (e.g., sending the balance-access information and permission to use the same) to the third computing device as a result of the third geolocation not being within the threshold geographic distance to the first geolocation, as indicated by block 510. In some cases, this determination may be the same as the determination of block 506 except reaching the opposite result, such as the opposite result of any of the above-describe examples, e.g., based on region, travel time, co-occurrence rates, and the like, in some cases with thresholds dynamically adjusted based on card demand, risk, and similarities of user profiles.

In some embodiments, as noted above, users may be relatively latency sensitive when issuing the above-described requests. Iterating through candidate responses until one satisfies the presently described constraints may be relatively slow and difficult to predict in terms of response time. To mitigate these issues, some embodiments may index stored value cards according to various criteria, such as according to geolocations in which the stored value card is not to be provided to users or geolocations in which the stored value card is permitted to be provided to users, such as a white list of geographic regions or a blacklist of geographic regions.

Next, some embodiments may send the balance-access information of the stored value card to the third computing device, as indicated by block 512. In some cases, the third computing device may later return the stored value card with a diminished balance, after an authorized transaction, and the stored value card may be returned to inventory and used in subsequent transactions by other users.

Some embodiments may receive an indication that a balance of the stored value card has been depleted by unauthorized party, as indicated by block 514. In some cases, the step may be performed after block 502, after block 512, or after the third computing device (or an associated user operating a different computing device) has returned the stored value card. In these scenarios, with many traditional techniques, it can be relatively difficult to identify which previous possessor of the stored value card information engaged in fraud, as often merchant records do not include identifiers of the user. Many stored value cards are treated as analogous to cash for purposes of documenting the identity of the person engaging in the transaction. However, some embodiments of the present techniques may permit the likely party responsible for the fraud to be probabilistically identified. In some cases, the indication may be a complaint by a subsequent holder of the stored value card that the card was insufficient to satisfy a transaction balance, or some embodiments may periodically automatically query an issuer or bank associated with the stored value card to identify a current card balance and compare that current card balance to an expected card balance of the previously returned card amount. The discrepancy may constitute an indication of block 514.

Or in some cases, the indication is merely a user complaint, and some embodiments may proceed to determine that a balance of the stored value card is less than a balance attributable to authorize transactions, as indicated by block 516. For instance, some embodiments may query an API of a bank or issuer of the card for a current balance, and in some cases receive a response indicating attributes of transactions in which the stored value card is been used. In some cases, the response includes dates, times, locations, and merchants where the various transactions occurred.

From this report, some embodiments may obtain a record of an unauthorized transaction in which the stored value card was used, as indicated by block 518. In some cases, the issuer or bank does not offer an API, and some embodiments may interface with an automated telephone system, for instance by executing a text-to-voice routine that translates a text script to an audio signal transmitted over a telephone line to navigate through the automated telephone system and request the needed information. Some embodiments may then receive the responsive audio signal and translate the audio to text to obtain the record of the previous transactions.

Next, some embodiments may determine from the obtain record an unauthorized-transaction geolocation in which the unauthorized transaction occurred, as indicated by block 520. In some cases, the geolocation may be a street address of a merchant at which the stored value card was fraudulently used. Some embodiments may also maintain a record of each user's geolocation history and compare a current geolocation to the history to determine whether the user is at a location where a balance was accessed or at a different location for the same or a related merchant. For example, some embodiments may detect a fraudulent use based on this analysis that a user legitimately accessed a stored value card on a given day at a given merchant geolocation, then returned the card to the gift card management system, and on a later day returned to the same merchant geolocation (or that of another merchant in a chain) illegitimately accessed a balance of the stored value card.

Next, some embodiments may infer a user account of a user that engaged in the unauthorized transaction based on the unauthorized-transaction geolocation, as indicated by block 522. For instance, some embodiments may identify or otherwise access a set of previous possessors of the balance-access information of the stored value card from the stored value card record, and rank the geolocations associated with each instance in which the card was received or sent according to distance to the unauthorized-transaction geolocation. In some cases, the user account associated with a conveyance having the shortest distance may be deemed as a likely party to have engaged in fraud. In some cases, the strength of this inference may be enhanced by the relative geographic distance among the previous possessors. For instance, if the first computing device is in Seattle, Wash. and the third computing devices in Miami, Fla., while the unauthorized-transaction geolocation is also in Seattle, Wash., the user of the first computing device may be inferred to be the party that engaged in a fraudulent unauthorized use of the stored value card with relatively high confidence. Alternatively, if the unauthorized transaction occurred in Fort Lauderdale, Fla., the user associated with the third computing device may be inferred with similar confidence to be the party that likely engaged in a fraudulent unauthorized use of the stored value card.

Some embodiments may respond by designating the corresponding user accounts in memory as being blocked from conveying (e.g., either receiving or providing) stored value cards. In some cases, the designation is at a lower level of confidence, and users may be designated differently in response. In some embodiments, the distance between the unauthorized-transaction geolocation and the geolocation associated with the user may be compared to a threshold, and if the distance is greater than the threshold, some embodiments may adjust (e.g., add to an accumulated score) a risk score associated with corresponding user based on the distance. Upon a user's accumulated risk score exceeding some threshold, some embodiments may designate the user as blocked from future conveyances of stored value cards. In some cases, the inference may also be based on, or instead be based on, other attributes of user profiles matching attributes of the unauthorized transaction. For instance, the threshold geographic distance for blocking a user may be adjusted based on a determination that the merchants or merchant category in which the unauthorized transaction occurred corresponds to a merchant or merchant category having greater than a threshold rank according to frequency in a user profile of the respective user.

Thus, some embodiments may identify and block users likely to have engaged in fraudulent use of stored value cards by selectively distributing stored value cards in a way that enhances the strength of various signals by which unauthorized transactions may be matched with previous possessors of stored value card information.

Figure 6:
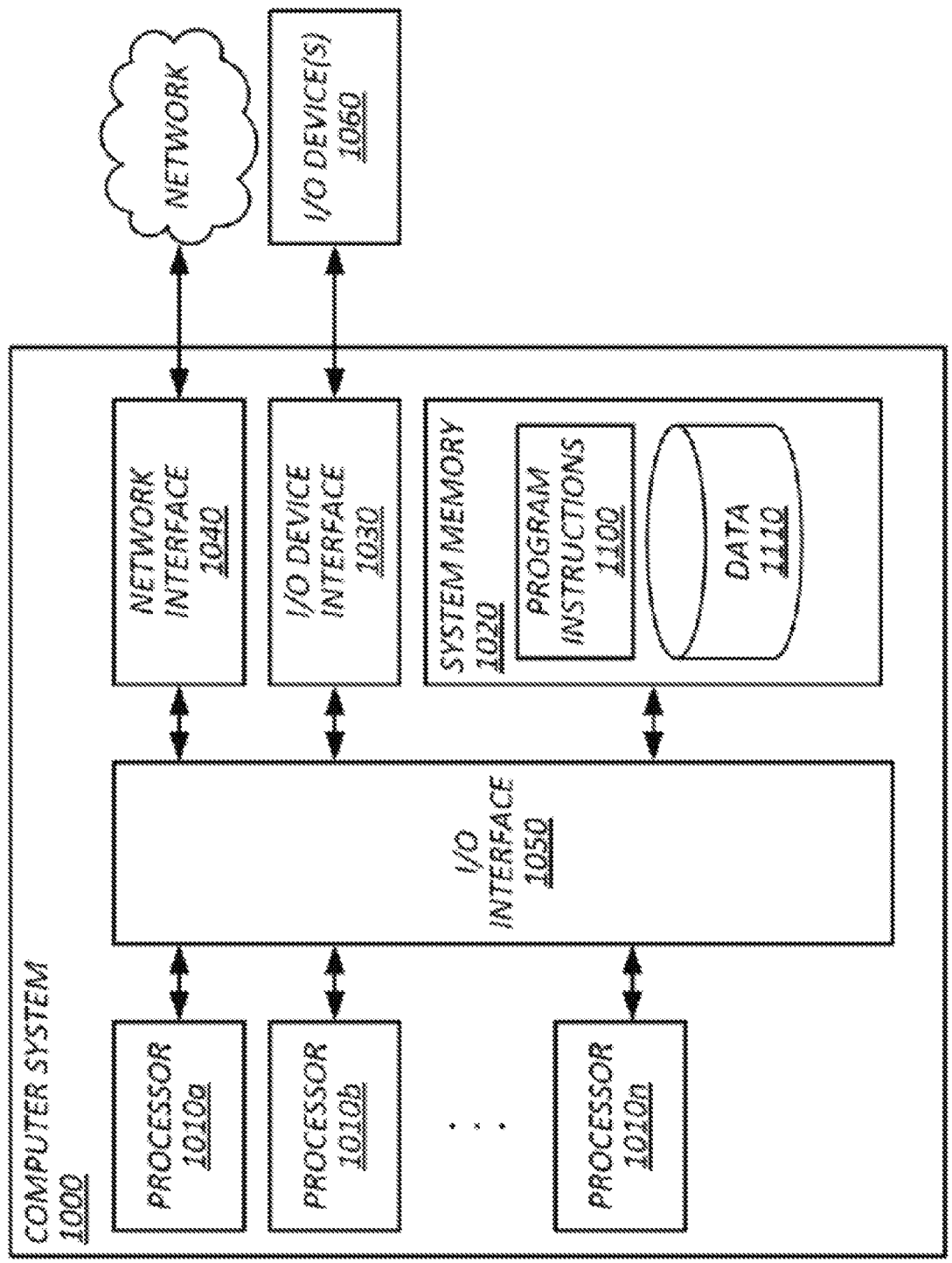
FIG. 6 illustrates an example of a computer system by which the above techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-

1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method, comprising: receiving, with one or more processors, a stored value card from a first computing device and a first geolocation of the first computing device, the first computing device having balance access information of the stored value card; receiving, with one or more processors, a request for a stored value card from a second computing device at a second geolocation; determining, with one or more processors, to not send the stored value card to the second computing device as a result of the second geolocation being within a threshold geographic distance to the first geolocation; receiving, with one or more processors, another request for a stored value card from a third computing device at a third geolocation; and determining, with one or more processors, to send the stored value card to the third computing device as a result of the third geolocation not being within the threshold geographic distance to the first geolocation; and sending balance-access information of the stored value card to the third computing device.

2. The method of embodiment 1, wherein determining to not send the stored value card to the second computing device as a result of the second geolocation being within a threshold geographic distance to the first geolocation comprises: determining that the second geolocation is within the threshold geographic distance of the first geolocation.

3. The method of any of embodiments 1-2, wherein determining to not send the stored value card to the second computing device as a result of the second geolocation being within a threshold geographic distance to the first geolocation comprises: determining that the second geolocation is within a threshold travel duration by automobile of the first geolocation.

4. The method of any of embodiments 1-3, wherein determining to not send the stored value card to the second computing device as a result of the second geolocation being within a threshold geographic distance to the first geolocation comprises: determining that the second geolocation has higher than a threshold co-occurrence amount of historical user geolocation with the first geolocation.

5. The method of any of embodiments 1-4, wherein determining to not send the stored value card to the second computing device as a result of the second geolocation being within a threshold geographic distance to the first geolocation comprises: before receiving the request for the stored value card from the second computing device, determining a geographic region including the second geolocation to which the stored value card will not be provided and associating the geographic region with the stored value card.

6. The method of any of embodiments 1-5, wherein determining to not send the stored value card to the second computing device as a result of the second geolocation being within a threshold geographic distance to the first geolocation comprises: before receiving the request for the stored value card from the second computing device, determining a geographic region excluding the second geolocation to which the stored value card will be provided and associating the geographic region with the stored value card.

7. The method of any of embodiments 1-6, wherein: the stored value card is associated with a plurality of geolocations, including the first geolocation, at which a computing device has had access to the balance-access information of the stored value card; and determining to send the stored value card to the third computing device as a result of the third geolocation not being within the threshold geographic distance to the first geolocation comprises: determining to send the stored value card to the third computing device as a result of the third geolocation not being within the threshold geographic distance to any of the plurality of geolocations.

8. The method of embodiment 7, wherein determining to send the stored value card to the third computing device as a result of the third geolocation not being within the threshold geographic distance to any of the plurality of geolocations comprises: determining the third geolocation is not within the threshold distance to any of the plurality of geolocations.

9. The method of any of embodiments 1-8, wherein determining to send the stored value card to the third computing device comprises: accessing a record of past transactions by a user associated with the first computing device; accessing another record of past transactions by a user associated with the third computing device; and determining that the first record of past transactions has less than a threshold amount of overlap with the other record of past transactions.

10. The method of embodiment 9, wherein the amount of overlap is based on an amount of brands of purchased goods that overlap.

11. The method of embodiment 9, wherein the amount of overlap is based on an amount of categories of purchased products that overlap.

12. The method of any of embodiments 1-10, comprising: after sending balance-access information of the stored value card to the third computing device, receiving an indication that a balance of the stored value card has been depleted by an unauthorized party; determining that a balance of the stored value card is less than a balance attributable to authorized transactions; obtaining a record of an unauthorized transaction in which the stored value card was used, where the unauthorized transaction occurred after receiving the stored value card and before determining that the balance is less than a balance attributable to authorized transactions; determining from the obtained record a unauthorized-transaction geolocation in which the unauthorized transaction occurred; and inferring a user account of user that engaged in the unauthorized transaction based on the unauthorized-transaction geolocation.

13. The method of embodiment 12, wherein inferring a user account comprises: inferring that a user account associated with the first computing device is that of a user who engaged in the unauthorized-transaction geolocation as a result of the unauthorized-transaction geolocation being within a threshold distance of the first geolocation.

14. The method of any of embodiments 12-13, wherein inferring a user account comprises: inferring that a user account associated with the first computing device is that of a user who engaged in the unauthorized-transaction geolocation as a result of both the unauthorized-transaction geolocation being within a threshold distance of the first geolocation and the unauthorized-transaction geolocation not being within a threshold distance of the third geolocation.

15. The method of any of embodiments 12-14, wherein inferring a user account comprises: inferring that a user account associated with the first computing device is that of a user who engaged in the unauthorized-transaction geolocation in response to determining that the unauthorized-transaction geolocation is within the threshold distance of the first geolocation.

16. The method of any of embodiments 12-15, wherein inferring a user account comprises: inferring that a user account associated with the first computing device is that of a user who engaged in the unauthorized-transaction geolocation in response to determining that the unauthorized-transaction geolocation is within a region occupied by the first geolocation and not the third geolocation.

17. The method of any of embodiments 12-16, wherein inferring a user account comprises: inferring that a user account associated with the first computing device is that of a user who engaged in the unauthorized-transaction geolocation in response to determining that the unauthorized-transaction geolocation is within a threshold travel time of the first geolocation.

18. The method of any of embodiments 12-17, wherein inferring a user account comprises: inferring that a user account associated with the first computing device is that of a user who engaged in the unauthorized-transaction geolocation in response to determining that the unauthorized-transaction geolocation has greater than a threshold co-occurrence amount of historical user geolocations with the first geolocation.

19. The method of any of embodiments 1-18, comprising: steps for inferring a user account associated with an unauthorized transaction.

20. The method of any of embodiments 1-19, comprising: receiving a given request for a stored value card from a fourth computing device before receiving the request from the second computing device; and determining to not send the stored value card to the fourth computing device in response to determining that the given request is received less than a threshold amount of time after receiving the stored value card.

21. A system, comprising: one or more processors; and memory storing instructions that when executed by the processors cause the processors to effectuate operations comprising: the operations of any of embodiments 1-20.

1. A tangible, non-transitory machine-readable media storing instructions that when executed by one or more processors effectuate operations comprising: the operations of any of embodiments 1-20.

What is claimed is:

1. A method, comprising:
receiving, with one or more processors, a stored value card from a first computing device and a first geolocation of the first computing device, the first computing device having balance access information of the stored value card;
updating, with one or more processors, in a repository a record for the stored value card in response to receiving the stored value card from the first computing device, the record comprising the balance access information of the stored value card and a set of geolocations, including at least the first geolocation, corresponding to geolocations of user computing devices having had the balance access information of the stored value card, and the repository comprising a plurality of other records for other stored value cards;
receiving, with one or more processors, a request for a stored value card from a second computing device at a second geolocation, the request indicating criteria satisfiable by stored value cards;

identifying within the repository, with one or more processors, the record of the stored value card as satisfying the criteria for the request received from the second computing device;

determining, with one or more processors, to not send the stored value card received from the first computing device and satisfying the criteria to the second computing device as a result of the second geolocation being within a threshold geographic distance to the first geolocation;

receiving, with one or more processors, another request for a stored value card from a third computing device at a third geolocation, the another request indicating criteria satisfiable by stored value cards;

identifying within the repository, with one or more processors, the record of the stored value card as satisfying the criteria for the another request received from the third computing device;

determining, with one or more processors, to send the stored value card received from the first computing device and satisfying the criteria to the third computing device as a result of the third geolocation not being within the threshold geographic distance to the first geolocation or any other geolocation in the set of geolocations corresponding to geolocations of any other user computing devices having balance access information of the stored value card; and sending balance-access information of the stored value card to the third computing device.

2. The method of claim 1, wherein determining to not send the stored value card to the second computing device as a result of the second geolocation being within a threshold geographic distance to the first geolocation comprises:
determining that the second geolocation is within the threshold geographic distance of the first geolocation.

3. The method of claim 1, wherein determining to not send the stored value card to the second computing device as a result of the second geolocation being within a threshold geographic distance to the first geolocation comprises:
determining that the second geolocation is within a threshold travel duration by automobile of the first geolocation.

4. The method of claim 1, wherein determining to not send the stored value card to the second computing device as a result of the second geolocation being within a threshold geographic distance to the first geolocation comprises:
determining that the second geolocation has higher than a threshold co-occurrence amount of historical user geolocation with the first geolocation.

5. The method of claim 1, wherein determining to not send the stored value card to the second computing device as a result of the second geolocation being within a threshold geographic distance to the first geolocation comprises:
before receiving the request for the stored value card from the second computing device, determining a geographic region including the second geolocation to which the stored value card will not be provided and associating the geographic region with the stored value card.

6. The method of claim 1, wherein determining to not send the stored value card to the second computing device as a result of the second geolocation being within a threshold geographic distance to the first geolocation comprises:
before receiving the request for the stored value card from the second computing device, determining a geographic region excluding the second geolocation to which the stored value card will be provided and associating the geographic region with the stored value card.

7. The method of claim 1, wherein determining to send the stored value card to the third computing device as a result of the third geolocation not being within the threshold geographic distance to any of the plurality of geolocations comprises:
determining the third geolocation is not within the threshold distance to any of the plurality of geolocations.

8. The method of claim 1, wherein determining to send the stored value card to the third computing device comprises:
accessing a record of past transactions by a user associated with the first computing device;
accessing another record of past transactions by a user associated with the third computing device; and
determining that the first record of past transactions has less than a threshold amount of overlap with the other record of past transactions.

9. The method of claim 8, wherein the amount of overlap is based on an amount of brands of purchased goods that overlap.

10. The method of claim 8, wherein the amount of overlap is based on an amount of categories of purchased products that overlap.

11. The method of claim 1, comprising:
after sending balance-access information of the stored value card to the third computing device, receiving an indication that a balance of the stored value card has been depleted by an unauthorized party;
determining that a balance of the stored value card is less than a balance attributable to authorized transactions;
obtaining a record of an unauthorized transaction in which the stored value card was used, where the unauthorized transaction occurred after receiving the stored value card and before determining that the balance is less than a balance attributable to authorized transactions;
determining from the obtained record an unauthorized-transaction geolocation in which the unauthorized transaction occurred; and
inferring a user account of user that engaged in the unauthorized transaction based on the unauthorized-transaction geolocation.

12. The method of claim 11, wherein inferring a user account comprises:
inferring that a user account associated with the first computing device is that of a user who engaged in the unauthorized-transaction geolocation as a result of the unauthorized-transaction geolocation being within a threshold distance of the first geolocation.

13. The method of claim 11, wherein inferring a user account comprises:
inferring that a user account associated with the first computing device is that of a user who engaged in the unauthorized-transaction geolocation as a result of both the unauthorized-transaction geolocation being within a threshold distance of the first geolocation and the unauthorized-transaction geolocation not being within a threshold distance of the third geolocation.

14. The method of claim 11, wherein inferring a user account comprises:
inferring that a user account associated with the first computing device is that of a user who engaged in the unauthorized-transaction geolocation in response to determining that the unauthorized-transaction geolocation is within the threshold distance of the first geolocation.

15. The method of claim 11, wherein inferring a user account comprises:
inferring that a user account associated with the first computing device is that of a user who engaged in the unauthorized-transaction geolocation in response to determining that the unauthorized-transaction geolocation is within a region occupied by the first geolocation and not the third geolocation.

16. The method of claim 11, wherein inferring a user account comprises:
inferring that a user account associated with the first computing device is that of a user who engaged in the unauthorized-transaction geolocation in response to determining that the unauthorized-transaction geolocation is within a threshold travel time of the first geolocation.

17. The method of claim 11, wherein inferring a user account comprises:
inferring that a user account associated with the first computing device is that of a user who engaged in the unauthorized-transaction geolocation in response to determining that the unauthorized-transaction geolocation has greater than a threshold co-occurrence amount of historical user geolocations with the first geolocation.

18. The method of claim 1, comprising:
steps for inferring a user account associated with an unauthorized transaction.

19. The method of claim 1, comprising:
receiving a request for a stored value card from a fourth computing device before receiving the request from the second computing device; and
determining to not send the stored value card to the fourth computing device in response to determining that the request from the fourth computing device is received less than a threshold amount of time after receiving the stored value card.

20. A system, comprising:
one or more processors; and
memory storing instructions that when executed by at least some of the processors effectuate operations comprising:
receiving a stored value card from a first computing device and a first geolocation of the first computing device, the first computing device having balance access information of the stored value card;
updating in a repository a record for the stored value card in response to receiving the stored value card from the first computing device, the record comprising the balance access information of the stored value card and a set of geolocations, including at least the first geolocation, corresponding to geolocations of user computing devices having had the balance access information of the stored value card, and the repository comprising a plurality of other records for other stored value cards;
receiving a request for a stored value card from a second computing device at a second geolocation, the request indicating criteria satisfiable by stored value cards;
identifying within the repository the record of the stored value card as satisfying the criteria for the request received from the second computing device;
determining to not send the stored value card received from the first computing device and satisfying the criteria to the second computing device as a result of the second geolocation being within a threshold geographic distance to the first geolocation;
receiving another request for a stored value card from a third computing device at a third geolocation, the another request indicating criteria satisfiable by stored value cards;
identifying within the repository the record of the stored value card as satisfying the criteria for the another request received from the third computing device;
determining to send the stored value card received from the first computing device and satisfying the criteria to the third computing device as a result of the third geolocation not being within the threshold geographic distance to the first geolocation or any other geolocation in the set of geolocations corresponding to geolocations of any other user computing devices having balance access information of the stored value card; and
sending balance-access information of the stored value card to the third computing device.

21. A tangible, non-transitory, machine-readable medium storing instructions that when executed by one or more processors effectuate operations comprising:
receiving, with one or more processors, a set of information from a first computing device and a first geolocation of the first computing device, the set of information including confidential information;
updating, with one or more processors, in a repository a record of the set of information in response to receiving the set of information from the first computing device, the record comprising the set of information and a set of geolocations, including at least the first geolocation, corresponding to geolocations of user computing devices having had access to the set of information, and the repository comprising a plurality of other records for other sets of information;
receiving, with one or more processors, a request for a set of information from a second computing device at a second geolocation, the request indicating criteria satisfiable by sets of information;
identifying within the repository, with one or more processors, the record of the set of information as satisfying the criteria for the request received from the second computing device;
determining, with one or more processors, to not send the set of information received from the first computing device and satisfying the criteria to the second computing device as a result of the second geolocation being within a threshold geographic distance to the first geolocation;
receiving, with one or more processors, another request for a the set of information from a third computing device at a third geolocation, the another request indicating criteria satisfiable by sets of information;
identifying within the repository, with one or more processors, the record of the set of information as satisfying the criteria for the another request received from the third computing device;
determining, with one or more processors, to send the set of information received from the first computing device and satisfying the criteria to the third computing device as a result of the third geolocation not being within the threshold geographic distance to the first geolocation or any other geolocation in the set of geolocations corresponding to geolocations of any other user computing devices having had access to the set of information; and sending at least a confidential part of set of information to the third computing device.

22. The medium of claim 21, wherein determining to not send the stored value card to the second computing device as a result of the second geolocation being within a threshold geographic distance to the first geolocation comprises:
   determining that the second geolocation is within the threshold geographic distance of the first geolocation.

23. The medium of claim 21, wherein determining to not send the stored value card to the second computing device as a result of the second geolocation being within a threshold geographic distance to the first geolocation comprises:
   determining that the second geolocation is within a threshold travel duration by automobile of the first geolocation.

24. The medium of claim 21, wherein determining to not send the stored value card to the second computing device as a result of the second geolocation being within a threshold geographic distance to the first geolocation comprises:
   determining that the second geolocation has higher than a threshold co-occurrence amount of historical user geolocation with the first geolocation.

25. The medium of claim 21, wherein determining to not send the stored value card to the second computing device as a result of the second geolocation being within a threshold geographic distance to the first geolocation comprises:
   before receiving the request for the stored value card from the second computing device, determining a geographic region including the second geolocation to which the stored value card will not be provided and associating the geographic region with the stored value card.

26. The medium of claim 21, wherein determining to not send the stored value card to the second computing device as a result of the second geolocation being within a threshold geographic distance to the first geolocation comprises:
   before receiving the request for the stored value card from the second computing device, determining a geographic region excluding the second geolocation to which the stored value card will be provided and associating the geographic region with the stored value card.

27. The medium of claim 21, wherein determining to send the stored value card to the third computing device as a result of the third geolocation not being within the threshold geographic distance to any of the plurality of geolocations comprises:
   determining the third geolocation is not within the threshold distance to any of the plurality of geolocations.

28. The medium of claim 21, wherein determining to send the stored value card to the third computing device comprises:
   accessing a record of past transactions by a user associated with the first computing device;
   accessing another record of past transactions by a user associated with the third computing device; and
   determining that the first record of past transactions has less than a threshold amount of overlap with the other record of past transactions.

29. The medium of claim 28, wherein the amount of overlap is based on an amount of brands of purchased goods that overlap.

30. The medium of claim 28, wherein the amount of overlap is based on an amount of categories of purchased products that overlap.

31. The medium of claim 21, wherein the operations comprise:
   after sending balance-access information of the stored value card to the third computing device, receiving an indication that a balance of the stored value card has been depleted by an unauthorized party;
   determining that a balance of the stored value card is less than a balance attributable to authorized transactions;
   obtaining a record of an unauthorized transaction in which the stored value card was used, where the unauthorized transaction occurred after receiving the stored value card and before determining that the balance is less than a balance attributable to authorized transactions;
   determining from the obtained record an unauthorized-transaction geolocation in which the unauthorized transaction occurred; and
   inferring a user account of user that engaged in the unauthorized transaction based on the unauthorized-transaction geolocation.

32. The medium of claim 31, wherein inferring a user account comprises:
   inferring that a user account associated with the first computing device is that of a user who engaged in the unauthorized-transaction geolocation as a result of the unauthorized-transaction geolocation being within a threshold distance of the first geolocation.

33. The medium of claim 31, wherein inferring a user account comprises:
   inferring that a user account associated with the first computing device is that of a user who engaged in the unauthorized-transaction geolocation as a result of both the unauthorized- transaction geolocation being within a threshold distance of the first geolocation and the unauthorized-transaction geolocation not being within a threshold distance of the third geolocation.

34. The medium of claim 31, wherein inferring a user account comprises:
   inferring that a user account associated with the first computing device is that of a user who engaged in the unauthorized-transaction geolocation in response to determining that the unauthorized-transaction geolocation is within the threshold distance of the first geolocation.

35. The medium of claim 31, wherein inferring a user account comprises:
   inferring that a user account associated with the first computing device is that of a user who engaged in the unauthorized-transaction geolocation in response to determining that the unauthorized-transaction geolocation is within a region occupied by the first geolocation and not the third geolocation.

36. The medium of claim 31, wherein inferring a user account comprises:
   inferring that a user account associated with the first computing device is that of a user who engaged in the unauthorized-transaction geolocation in response to determining that the unauthorized-transaction geolocation is within a threshold travel time of the first geolocation.

37. The medium of claim 31, wherein inferring a user account comprises:
   inferring that a user account associated with the first computing device is that of a user who engaged in the unauthorized-transaction geolocation in response to determining that the unauthorized-transaction geolocation has greater than a threshold co-occurrence amount of historical user geolocations with the first geolocation.

38. The medium of claim 21, wherein the operations comprise:
  steps for inferring a user account associated with an unauthorized transaction.

39. The medium of claim 21, wherein the operations comprise:
  receiving a request for a stored value card from a fourth computing device before receiving the request from the second computing device; and
  determining to not send the stored value card to the fourth computing device in response to determining that the request from the fourth computing device is received less than a threshold amount of time after receiving the stored value card.

* * * * *